(12) United States Patent
Han et al.

(10) Patent No.: US 11,265,825 B2
(45) Date of Patent: Mar. 1, 2022

(54) POWER HEADROOM REPORTING FOR WIRELESS COMMUNICATION

(71) Applicant: QUALCOMM Incorporated, San Diego, CA (US)

(72) Inventors: Junsheng Han, Sunnyvale, CA (US); Valentin Alexandru Gheorghiu, Tokyo (JP); Xiao Feng Wang, San Diego, CA (US); Amir Aminzadeh Gohari, Sunnyvale, CA (US); Ruhua He, San Diego, CA (US); Raghu Narayan Challa, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 76 days.

(21) Appl. No.: 16/511,697

(22) Filed: Jul. 15, 2019

(65) Prior Publication Data
US 2020/0022093 A1 Jan. 16, 2020

Related U.S. Application Data

(60) Provisional application No. 62/698,375, filed on Jul. 16, 2018.

(51) Int. Cl.
*H04W 52/36* (2009.01)
*H04W 8/08* (2009.01)
(Continued)

(52) U.S. Cl.
CPC .......... *H04W 52/365* (2013.01); *H04W 8/08* (2013.01); *H04W 52/242* (2013.01); *H04W 72/046* (2013.01)

(58) Field of Classification Search
CPC ... H04W 52/365; H04W 8/08; H04W 52/242; H04W 72/046; H04B 7/0695
See application file for complete search history.

(56) References Cited

U.S. PATENT DOCUMENTS

2018/0132197 A1* 5/2018 Lin ..................... H04W 52/42
2018/0227862 A1* 8/2018 Liu ..................... H04B 7/063
(Continued)

FOREIGN PATENT DOCUMENTS

EP           3319376 A2     5/2018
WO       2018172854 A1     9/2018
(Continued)

OTHER PUBLICATIONS

International Search Report and Written Opinion—PCT/US2019/042035—ISA/EPO—dated Oct. 2, 2019.
(Continued)

*Primary Examiner* — Jeffrey M Rutkowski
*Assistant Examiner* — Chae S Lee
(74) *Attorney, Agent, or Firm* — Loza & Loza LLP

(57) ABSTRACT

Various aspects of the disclosure relate to reporting power headroom of an apparatus such as a user equipment (UE). For an apparatus that uses beamforming, the power headroom associated with the beam the apparatus is using for wireless communication (e.g., with a base station) may be lower than the power headroom associated with another beam that the apparatus could use for the wireless communication. The disclosure relates in some aspects to using one beam for wireless communication and using the power headroom for another beam for a power headroom report. In this way, the apparatus may always report its full transmit power capability.

26 Claims, 19 Drawing Sheets

(51) Int. Cl.
*H04W 52/24* (2009.01)
*H04W 72/04* (2009.01)

(56) References Cited

U.S. PATENT DOCUMENTS

| | | | | |
|---|---|---|---|---|
| 2018/0324715 | A1* | 11/2018 | Ryoo | H04W 76/18 |
| 2019/0098586 | A1 | 3/2019 | Akkarakaran et al. | |
| 2020/0145987 | A1* | 5/2020 | Ji | H04W 72/04 |
| 2020/0245264 | A1* | 7/2020 | Iwai | H04W 52/325 |
| 2021/0153142 | A1* | 5/2021 | Lee | H04W 52/365 |

FOREIGN PATENT DOCUMENTS

| | | |
|---|---|---|
| WO | 2018177549 A1 | 10/2018 |
| WO | 2019067014 A1 | 4/2019 |

OTHER PUBLICATIONS

Nokia et al., "UL Power Control for MIMO", 3GPP Draft, R1-1705978, 3rd Generation Partnership Project (3GPP), Mobile Competence Centre , 650, Route Des Lucioles, F-06921 Sophia-Antipolis Cedex, France, vol. RAN WG1, No. Spokane, WA, USA, Apr. 3, 2017-Apr. 7, 2017, Mar. 24, 2017 (Mar. 24, 2017), XP051250800, 6 Pages, Retrieved from the Internet: URL:http://www.3gpp.org/ftp/tsg_ran/WG1_RL1/TSGR1_88b/Docs/ [retrieved on Mar. 24, 2017].

* cited by examiner

POWER HEADROOM REPORTING FOR WIRELESS COMMUNICATION

CROSS-REFERENCE TO RELATED APPLICATION(S)

This application claims priority to and the benefit of provisional patent application No. 62/698,375 filed in the U.S. Patent and Trademark Office on Jul. 16, 2018, the entire content of which is incorporated herein by reference.

INTRODUCTION

Various aspects described herein relate to wireless communication and, more particularly but not exclusively, to reporting power headroom.

Some types of wireless communication devices use beamforming to provide a desired level of performance One example of such a device is a millimeter wave (mmW) device that can send and receive beamformed signals at mmW frequencies (e.g., in the range of 30 GHz, 60 GHz, etc.). Another example of a device that may use beamforming is a wireless multiple-in-multiple-out (MIMO) system where a transmitting device uses multiple antenna elements to send beamformed signals to a receiving device. In either case, a beamformed signal may be adjusted in phase (and, optionally, amplitude) such that the resulting signal power is focused toward the receiving device.

A device may use different types of beams in different scenarios. For example, a device may use a beam of a particular width in some cases, use narrower beams in other cases, and use wider beams in still other cases. The particular beam used for a communication may affect various aspects of the communication such as transmit power, scheduling, and power consumption. Thus, there is a need for effective techniques that enable a device to determine which beam to use when beamforming is supported.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory and a processing circuit coupled to the memory. The processing circuit is configured to: identify a plurality of candidate beams for a wireless communication, select a first beam of the plurality of candidate beams for the wireless communication, and report a power headroom for the wireless communication based on a second beam of the plurality of candidate beams.

In one aspect, the disclosure provides a method of communication for an apparatus. The method including: identifying a plurality of candidate beams for a wireless communication; selecting a first beam of the plurality of candidate beams for the wireless communication; and reporting a power headroom for the wireless communication based on a second beam of the plurality of candidate beams.

In one aspect, the disclosure provides an apparatus configured for communication. The apparatus including: means for identifying a plurality of candidate beams for a wireless communication; means for selecting a first beam of the plurality of candidate beams for the wireless communication; and means for reporting a power headroom for the wireless communication based on a second beam of the plurality of candidate beams.

In one aspect, the disclosure provides a non-transitory computer-readable medium storing computer-executable code, including code to: identify a plurality of candidate beams for a wireless communication; select a first beam of the plurality of candidate beams for the wireless communication; and report a power headroom for the wireless communication based on a second beam of the plurality of candidate beams.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
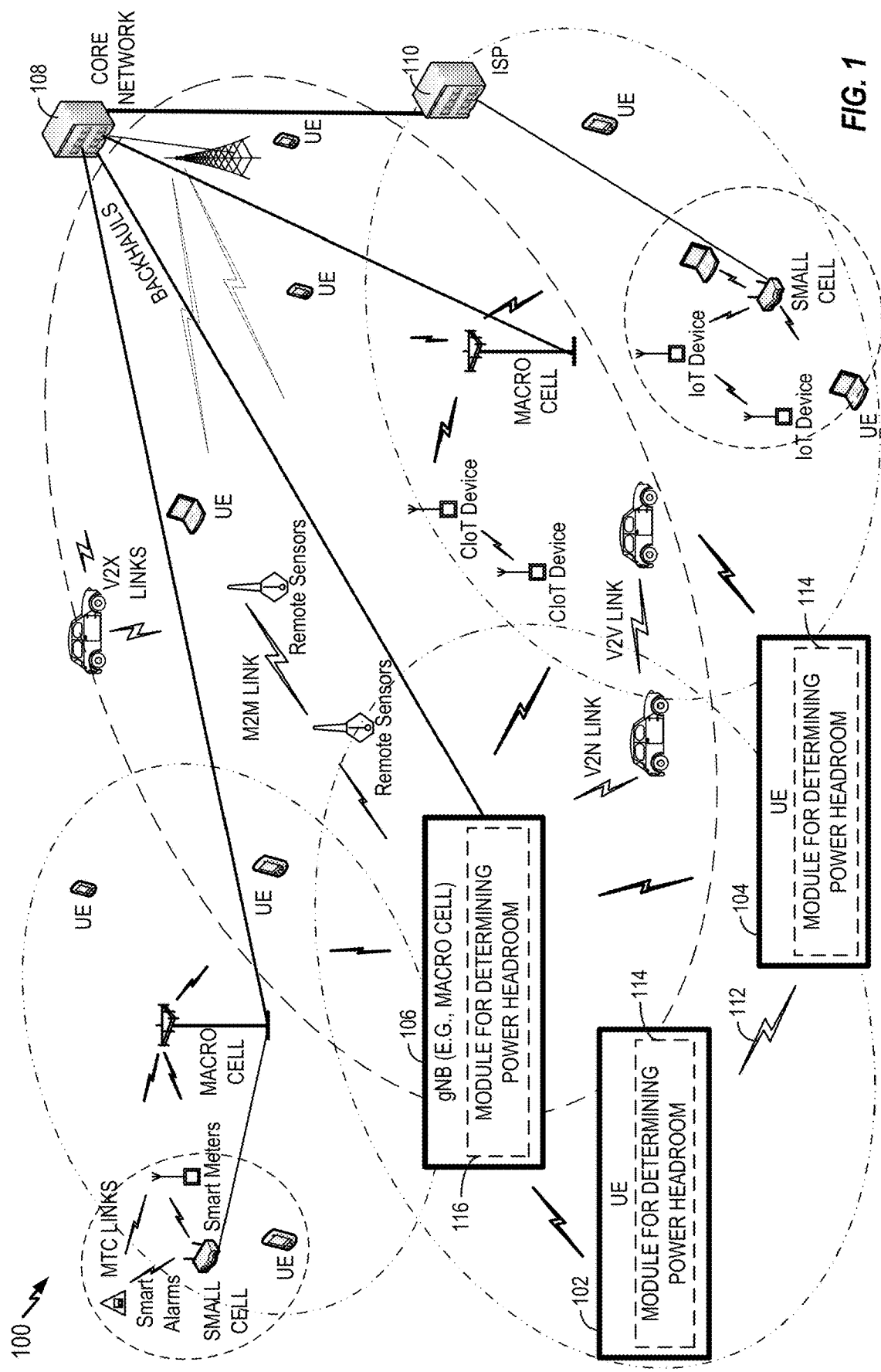
FIG. 1 is a block diagram illustrating an example communication system within which aspects of the disclosure may be implemented.

Various aspects of the disclosure relate to reporting power headroom of an apparatus such as a user equipment (UE). For an apparatus that uses beamforming, the power headroom associated with the beam the apparatus is using (or elects to use) for wireless communication (e.g., with a base station) may be lower than the power headroom associated with another beam that the apparatus could use for the wireless communication. The disclosure relates in some aspects to using one beam for wireless communication and reporting the power headroom for that communication based at least in part on another beam (or other beams). In this way, for example, the apparatus may report higher transmit power capability (e.g., the apparatus's full transmit power capability).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Thus, various aspects of the disclosure may be extended to networks based on 3rd Generation Partnership Project (3GPP) Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system and/or an LTE system. It should be appreciated, however, that the teachings herein may be used in other systems as well. Thus, references to functionality in the context of 5G and/or LTE terminology should be understood to be equally applicable to other types of technology, networks, components, signaling, and so on.

Example Communication System

FIG. 1 illustrates an example of a wireless communication system 100 where a user equipment (UE) can communicate with other devices via wireless communication signaling. For example, a first UE 102 and a second UE 104 may communicate with a gNB 106 or some other type of transmit receive point (TRP) using wireless communication resources managed by the gNB 106 and/or other network components (e.g., a core network 108, an internet service provider (ISP) 110, peer devices, and so on). In some implementations, one or more of the components of the system 100 may communicate with each other directly via a device-to-device (D2D) link 112 or some other similar type of direct link.

Communication of information between two or more of the components of the system 100 may involve sending uplink information or the like. For example, the gNB 106 may schedule the UE 102 or the UE 104 to send uplink information to the gNB 106. In some aspects, the scheduling for a given UE may depend on the power headroom reported by that UE. Accordingly, one or more of the UE 102, the UE 104, or some other component of the system 100, may include a module for determining power headroom 114 (e.g., for calculating and reporting power headroom). In addition, the gNB 106, or some other component of the system 100, may include a module for determining power headroom 116 (e.g., for obtaining power headroom reports).

The components and links of the wireless communication system 100 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a gNB or TRP may refer to a physical entity that incorporates radio head functionality for a particular physical cell. In some aspects, the gNB or TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a gNB or TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), such an apparatus may be referred to as a gNodeB (gNB), an eNB, a base station, or referenced using other terminology.

Various types of network-to-device links and D2D links may be supported in the wireless communication system 100. For example, D2D links may include, without limitation, machine-to-machine (M2M) links, MTC links, vehicle-to-vehicle (V2V) links, vehicle-to-anything (V2X) links, and cellular V2X (CV2X) links Network-to-device links may include, without limitation, uplinks (or reverse links), downlinks (or forward links), and vehicle-to-network (V2N) links Power Headroom Some communication networks (e.g., 5G NR frequency range 2 (5G NR FR2)) support beamforming in the downlink (DL) and the uplink (UL). For example, a gNB may communicate with a UE via beamformed links.

A gNB may use a power headroom report provided by a UE to schedule the UE. Here, the UE may use a power headroom report to signal how much more transmit power the UE has available in addition to the transmit power the UE is (or will be) using for a transmission. In general, power headroom may be determined by subtracting the transmit power from a power limit for the UE: power headroom=power limit−transmit power.

For beamformed communication, the transmit power may be calculated as a per-antenna element conducted power. This may represent, for example, the average power sent via each antenna element.

The power limit and the transmit power (from UL power control) can depend on the UE's selection of a transmit (Tx) beam and/or a receive (Rx) beam. For example, a different receive beam may be associated with a different path loss, which may lead to calculation of a different transmit power by the UE. In addition, a different transmit beam may be associated with a different maximum permissible exposure (MPE) constraint, which may lead to calculation of a different power limit by the UE.

An example of a UE beam selection process follows. The UE initially identifies two beams that it can use for receive operations and/or transmit operations. One beam, beam A, is a relatively wide beam. The other beam, beam B, is a more directional beam.

For a given transmission, the UE may prefer to use beam A over beam B. For example, the UE may use fewer antenna elements to generate beam A than it uses to generate beam B. Thus, since beam A doesn't require as many active antenna elements, beam A can be generated with lower power consumption than beam B. Accordingly, in a scenario where beam A provides sufficient equivalent isotropically radiated power (EIRP) for the current UL transmission, the UE may elect to use beam A for this UL transmission.

Conventionally, the UE would send a power headroom report based on beam A in the above scenario. In this case, however, the gNB would not know that the UE is capable of transmitting using beam B, which offers higher EIRP capability. If instead, the UE had chosen beam B for the transmission, the UE would have reported a higher power headroom (which is a more accurate reflection of the UE's current capability), but at the cost of higher power consumption.

The disclosure relates in some aspects to decoupling (or partially decoupling) a UE's serving beam for a given transmission from the beam that the UE uses to compute and report power headroom. For example, the UE referenced above can use beam A for the actual transmission, but report a power headroom that is computed using beam B. Here, the power headroom may be higher for beam B (a narrower beam than beam A) since the UE uses more antenna elements to transmit the beam (and, thereby, transmits at a lower transmit power level). As another example, the UE referenced above can use beam A for the actual transmission, but report a power headroom that is computed using beam B and, optionally, at least one other beam (which could include beam A).

In an example implementation, the UE may evaluate the power headroom among all beams that the UE has identified as being suitable for a particular UL transmission. The UE may then select the largest power headroom (or one of the larger power headrooms) as the power headroom to be reported. As another example, the UE may select a combination of the larger power headrooms (e.g., an average or a weighted combination) as the power headroom to be reported. Thus, the selection of the beam used for the power headroom report may be independent (or at least partially independent) of the beam selection for the UL transmission.

The above scheme is applicable to reporting of a virtual power headroom as well. For example, the highest (or a higher) virtual power headroom may be reported in a similar manner as discussed above. Here, the virtual power headroom may be calculated based on a nominal power limit and a virtual transmit power (e.g., from a virtual UL grant).

Example Communication Components

Figure 2:
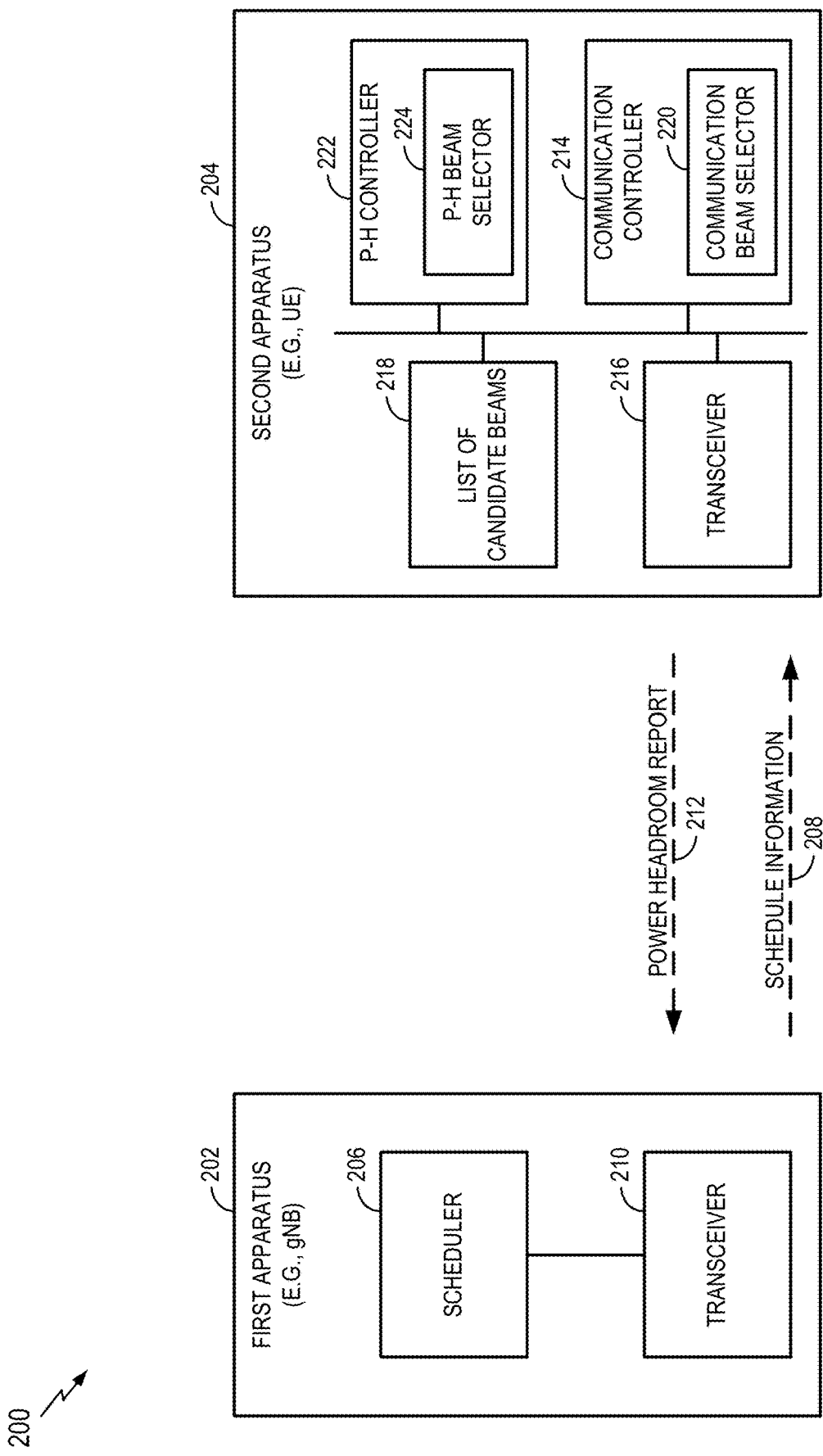
FIG. 2 is a block diagram illustrating an example communication system where an apparatus reports power headroom in accordance with some aspects of the disclosure.

FIG. 2 is a schematic illustration of a wireless communication system 200 that incorporates the teachings herein to more effectively report power headroom. The wireless communication system 200 includes a first apparatus 202 (e.g., a wireless communication device) and a second apparatus 204 (e.g., a wireless communication device), and potentially other apparatuses (not shown). In some implementations, the first apparatus 202 may correspond to the gNB 106 (e.g., a transmit receive point, a base station, etc.) or some other component of FIG. 1. In some implementations, the second apparatus 204 may correspond to the UE 102, the UE 104, or some other component of FIG. 1.

The first apparatus 202 includes a scheduler 206 for generating a schedule for communicating with the second apparatus 204. To this end, the first apparatus 202 may send schedule information 208 to the second apparatus 204 via a transceiver 210. Here, the schedule information 208 may be based on a power headroom report 212 sent by the second apparatus 204.

The second apparatus 204 includes a communication controller 214 for controlling communication with other apparatuses via a transceiver 216. In some aspects, the communication controller 214 may identify which beam or beams may be used to wirelessly communicate with the first apparatus 202, and maintain a corresponding list of candidate beams 218. As shown in FIG. 2, the communication controller 214 may include a communication beam selector 220 for selecting one of the candidate beams from the list of candidate beams 218 to use for wireless communication with the first apparatus 202.

The second apparatus 204 includes a power headroom (P-H) controller 222 for reporting power headroom to another apparatus (e.g., the first apparatus 202). As shown in FIG. 2, the power headroom controller 222 may include a power headroom (P-H) beam selector 224 for selecting one of the candidate beams from the list of candidate beams 218 to use for the power headroom report 212. In accordance with the teachings herein, the power headroom beam selector 224 may select at least one beam that is different from the beam selected by the communication beam selector 220.

Example Beams

Figure 3:
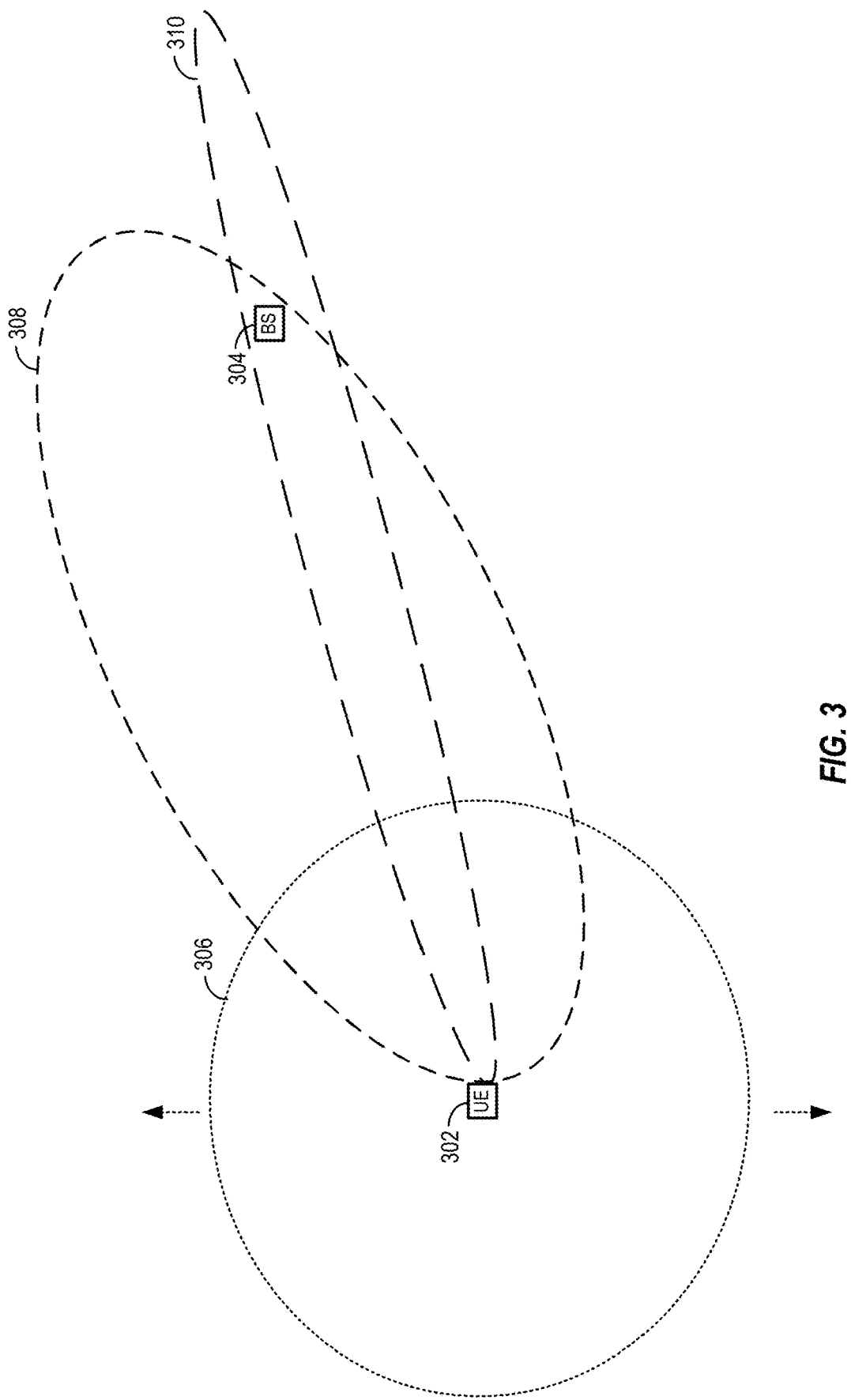
FIG. 3 is a diagram illustrating an example of different beams that may be used by an apparatus in accordance with some aspects of the disclosure.

FIG. 3 illustrates, in a simplified manner, examples of beams that a UE 302 may select for communication with another device (e.g., a BS 304) and/or reporting of power headroom. It should be appreciated that the UE 302 may be capable of generating other types of beams (e.g., with different beam widths and/or beam directions). The UE 302 may generate an omni-directional beam 306 using, for example, a single antenna element (not shown). The UE 302 may generate a narrower beam 308 using, for example, several antenna elements (not shown). In some cases, the generation of the beam 306 may result in lower power consumption than the generation of the beam 308. In some cases, the beam 308 may be associated with a higher power headroom than the beam 306. The UE 302 may generate an even narrower beam 310 using, for example, additional antenna elements (not shown). In some cases, the generation of the beam 308 may result in lower power consumption than the generation of the beam 310. In some cases, the beam 310 may be associated with a higher power headroom than the beam 308. As used herein, the term omni-directional beam refers to a beam that ideally is omni-directional but in practice is typically quasi-omni-directional.

In some implementations, the BS 304 may correspond to the gNB 106 (e.g., a transmit receive point, base station, etc.) or some other component of FIG. 1. In some implementations, the UE 302 may correspond to the UE 102, the UE 104, or some other component of FIG. 1.

Example Operations

Various operations that may be performed in conjunction with reporting power headroom in accordance with the teachings herein will now be described with reference to FIGS. 4-7. These operations may take place within a processing circuit (e.g., the processing circuit 1010 of FIG. 10 or the processing circuit 1210 of FIG. 12), which may be located in a UE, an access terminal, a gNB, a TRP, a base station, or some other suitable apparatus. Of course, in various aspects within the scope of the disclosure, these operations may be implemented by any suitable apparatus capable of supporting communication-related operations.

Figure 4:
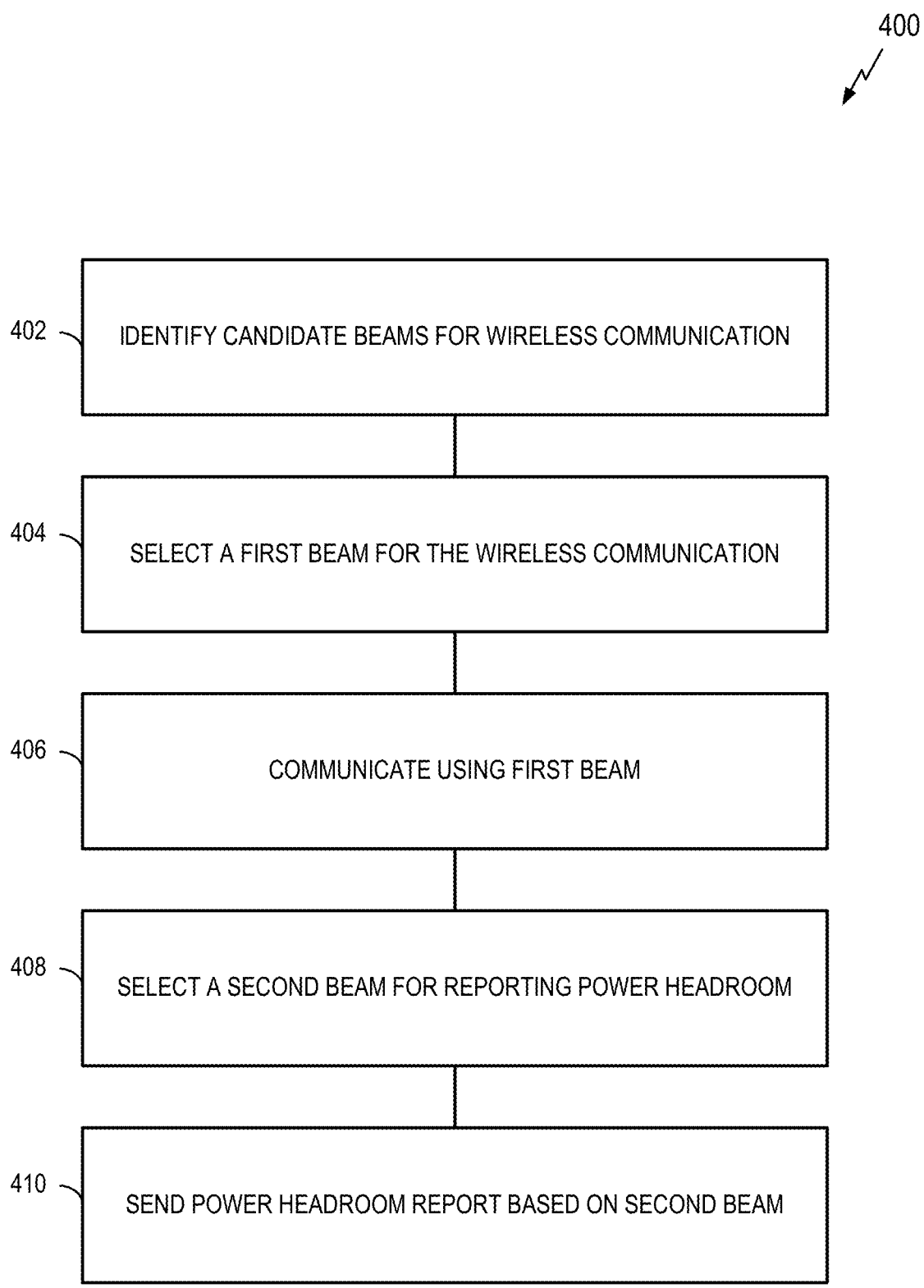
FIG. 4 is a flowchart illustrating an example of a process for reporting power headroom in accordance with some aspects of the disclosure.

FIG. 4 illustrates an example of a process 400 for reporting power headroom in accordance with some aspects of the disclosure. Here, one beam is used for wireless communication, but the power headroom of another beam is reported. As discussed herein, this approach may advantageously enable an apparatus to consume less power while more accurately reporting the current transmission capability (e.g., transmit power) of the apparatus.

At block 402, an apparatus (e.g., a UE) identifies a set of candidate beams that the apparatus may use for wireless communication with another apparatus (e.g., a gNB). For example, of the set of beams that a UE is able to generate, the UE may determine which of these beams is able to close a link with a gNB. This link may be associated with a particular spatial reference associated with the gNB (e.g., which may correspond to at least one receive beam that the gNB will use to receive information from the UE). For example, the apparatus may identity each beam that it could potentially use to transmit to the gNB on resources associated with a particular set of spatial reference parameters (e.g., a reference signal) broadcast or otherwise associated with the gNB. Such a reference signal may include, for example, an indication of a synchronization signal block (SSB), a channel state information reference signal (CSI-RS), or some other type of spatial-related information. The different beams of the set may include, for example, one or more of at least one omni-directional beam, at least one sector beam, at least one narrow beam (e.g., a refined beam), or any combination thereof.

As a nonlimiting example, the identification of a candidate beam may be based on: at least one path loss for a beam as estimated by the apparatus, reference signal received power (RSRP) for a beam as measured by the apparatus, mobility of the apparatus, at least one thermal limitation of the apparatus, at least signal-to-noise ratio (SNR) for a beam as measured by the apparatus, and so on. For example, one or more of these values may be compared to at least one threshold to determine whether the beam in question is acceptable to use to communicate with the other apparatus.

At block 404, the apparatus selects a first beam to use for the wireless communication. For example, the UE may elect to use an omni-directional beam or a relatively wide beam for communicating with the gNB. This election may be based on at least one criterion. For example, as discussed above, the UE may select a wider beam to conserve power. As another example, the UE may select a wider beam to account for the mobility of the apparatus (e.g., if the UE is moving, a wider beam may be more reliable).

At block 406, the apparatus communicates using the first beam selected at block 404. Alternatively or in addition, this communication may occur at a different time (e.g., after the gNB schedules the UE according to the power headroom report sent at block 410).

At block 408, the apparatus selects a second beam (different from the first beam) to use for reporting power headroom. This selection may be based on at least one criterion. For example, the UE may elect to report the power headroom associated with a beam that is narrower than the first beam. As another example, the UE may elect to report the power headroom associated with a beam that has a higher reference signal received power (RSRP) than the first beam. As still another example, the UE may elect to report the power headroom associated with a beam that has a lower path loss than the first beam. In this way, the UE may inform a gNB or other apparatus of a higher amount (e.g., the full amount) of power headroom available to the UE.

At block 410, the apparatus sends a power headroom report based on the second beam. For example, the power headroom report may include an indication of the power headroom associated with the second beam.

In some aspects, a process in accordance with the teachings herein may include any combination of the operations.

Figure 5:
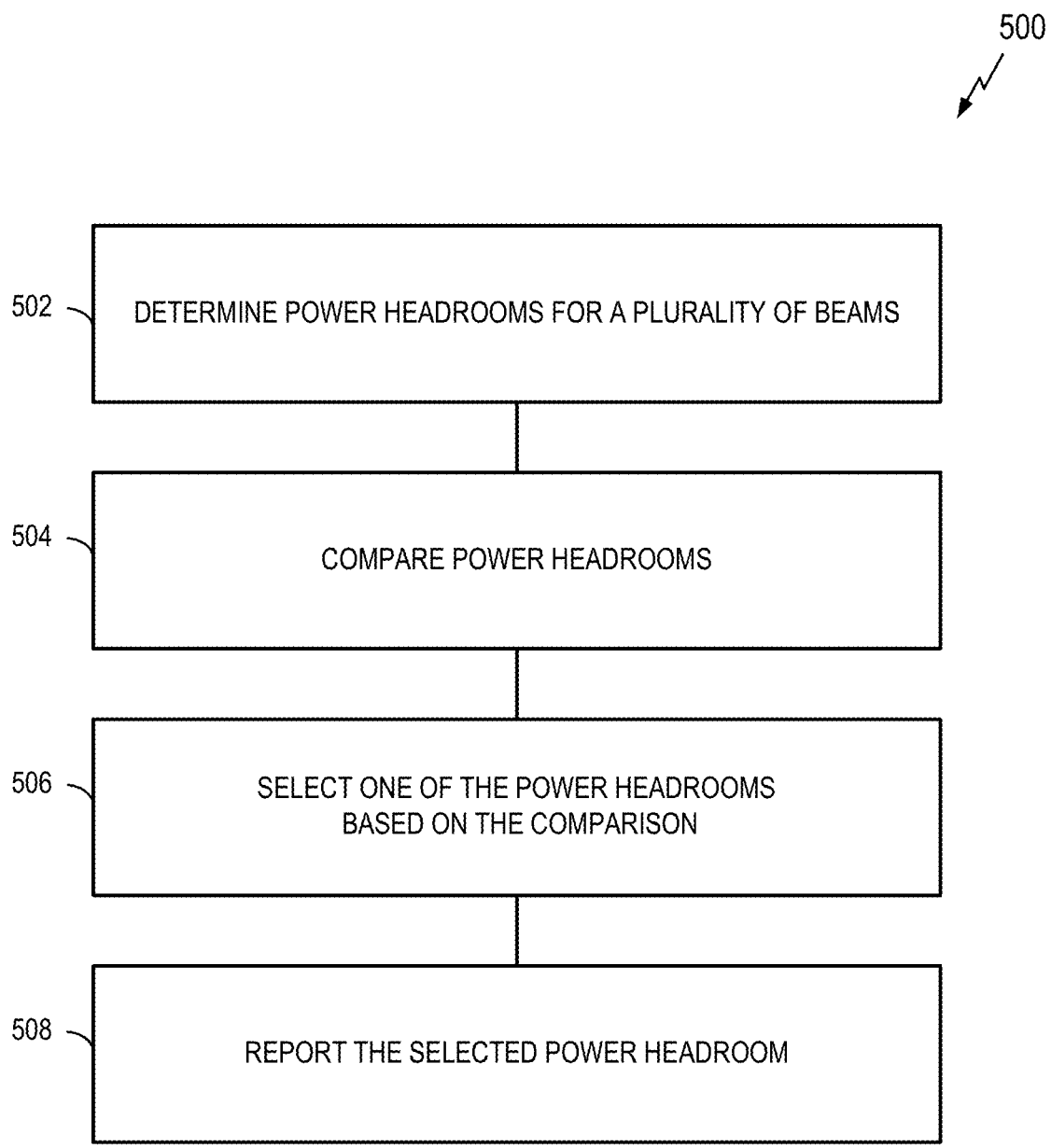
FIG. 5 is a flowchart illustrating an example of a process involving comparing power headrooms in accordance with some aspects of the disclosure.

FIG. 5 illustrates another example of a process 500 for reporting power headroom in accordance with some aspects of the disclosure. In this example, the power headroom reported is based on a comparison of the power headrooms for different beams. By selecting a beam with a higher power headroom, this approach may advantageously enable an apparatus to more accurately report the current transmission capability (e.g., transmit power) of the apparatus.

At block 502, an apparatus (e.g., a UE) determines power headrooms for a plurality of beams. For example, the apparatus may identify a first power headroom for a first beam, a second power headroom for a second beam, and so on. These beams may be candidate beams as discussed above in conjunction with FIG. 4.

At block 504, the apparatus compares the power headrooms. For example, the apparatus may compare the magnitude of the first power headroom to the magnitude of the second power headroom, and so on.

At block 506, the apparatus selects one of the power headrooms based on the comparison of block 504. For example, the apparatus may select the highest power headroom. In some aspects, the operations of blocks 502-504 may correspond to the operations of block 408 of FIG. 4.

At block 508, the apparatus reports the power headroom selected at block 506. As discussed herein, this power headroom may be associated with a different beam than the beam that the apparatus uses (e.g., is currently using) for wireless communication. In some aspects, the operations of block 508 may correspond to the operations of block 410 of FIG. 4.

In some aspects, a process in accordance with the teachings herein may include any combination of the above operations.

Figure 6:
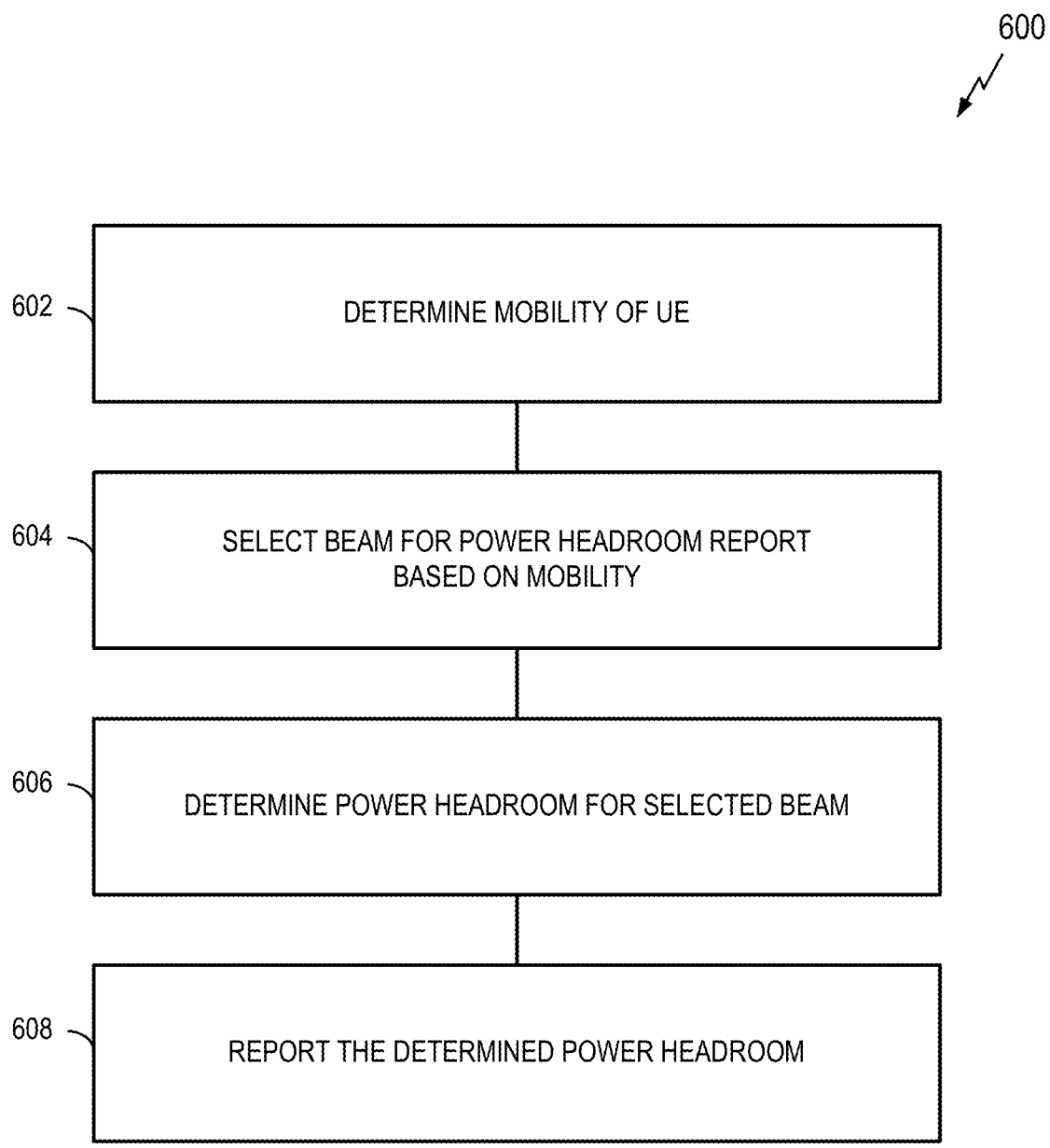
FIG. 6 is a flowchart illustrating an example of a process for selecting a beam for a power headroom report based on mobility in accordance with some aspects of the disclosure.

FIG. 6 illustrates another example of a process 600 for reporting power headroom in accordance with some aspects of the disclosure. In this example, the selection of the power headroom to be reported takes into consideration the mobility of an apparatus. By taking the mobility of an apparatus into consideration, this approach may advantageously enable an apparatus to select a beam that provides more reliable communication when the apparatus is moving.

At block 602, an apparatus (e.g., a UE) determines the mobility of a UE. For example, a UE may determine its rotation and compare that rotation with at least one rotation threshold (e.g., a threshold number of revolutions per minute). As another example, a UE may determine its movement and compare that movement with at least one movement threshold (e.g., a threshold velocity, a threshold acceleration, a threshold distance traveled, etc.).

At block 604, the apparatus selects a beam for a power headroom report based on the mobility of the UE as determined at block 602. For example, the apparatus may elect to use a wider beam if the mobility of the UE is relatively high (e.g., a high rate of rotation, a high velocity, etc.) In this way, a more conservative power headroom value may be reported to a gNB or other apparatus (e.g., since a power headroom associated with a narrower beam might not be valid for very long due to the mobility of the apparatus).

At block 606, the apparatus determines the power headroom of the beam selected at block 604. In some aspects, the operations of blocks 602-606 may correspond to the operations of block 408 of FIG. 4.

At block 608, the apparatus reports the power headroom determined at block 606. In this case, the power headroom may be associated with the same beam that the apparatus uses (e.g., is currently using) for wireless communication or a different beam depending on the circumstances. For example, if the UE selects a wide beam for communication and the mobility of the UE is low, the UE may select a different beam (e.g., a narrower beam) for the power headroom report. Conversely, if the UE selects a wide beam for communication and the mobility of the UE is high, the UE may select the same beam for the power headroom report. In some aspects, the operations of block 608 may correspond to the operations of block 410 of FIG. 4.

In some aspects, a process in accordance with the teachings herein may include any combination of the above operations.

Figure 7:
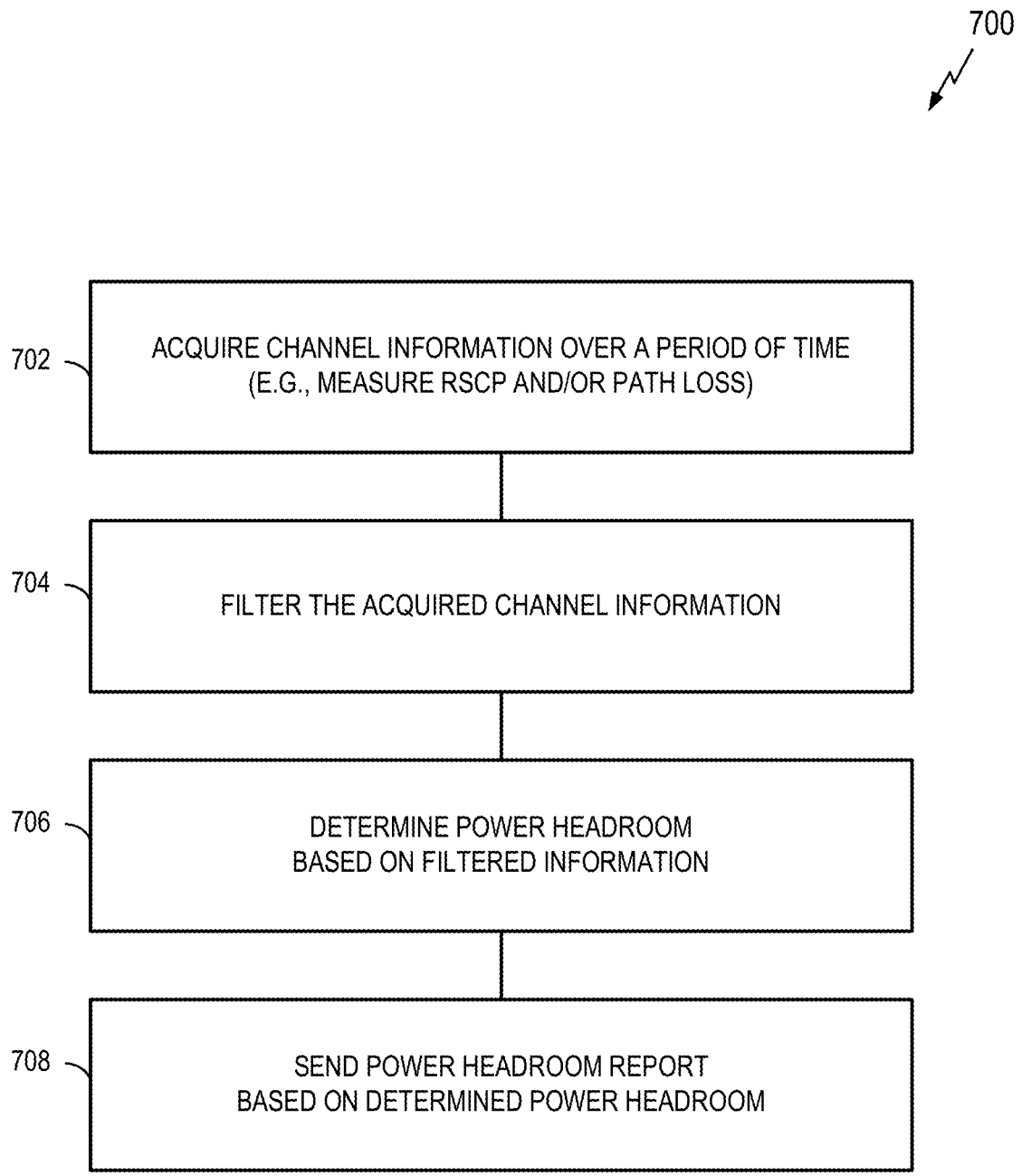
FIG. 7 is a flowchart illustrating an example of a process for determining power headroom in accordance with some aspects of the disclosure.

FIG. 7 illustrates another example of a process 700 for reporting power headroom in accordance with some aspects of the disclosure. In this example, the determination of the power headroom is based on filtering of information. By filtering the power headroom information (e.g., over time), this approach may advantageously enable an apparatus to more accurately report the current transmission capability (e.g., transmit power) of the apparatus.

At block 702, an apparatus (e.g., a UE) acquires channel information over a period of time. For example, a UE may store each of the received signal code power (RSCP) and/or reference signal received power (RSRP) values that the UE measures for a particular beam during a measurement window. As another example, a UE may store each of the path loss values that the UE estimates for a particular beam over a period of time. Other types of channel information may be acquired in other implementations.

At block 704, the apparatus filters the channel information acquired at block 702. For example, the apparatus may calculate an average RSCP, an average RSRP, an average path loss value, etc. Other types of combinatorial techniques could be used in various implementations.

At block 706, the apparatus determines the power headroom based on the filtered information from block 704. For example, the apparatus may calculate a power headroom based on an average path loss value. In some aspects, the operations of blocks 702-706 may correspond to the operations of block 404 and/or block 408 of FIG. 4. In some aspects, the operations of blocks 702-706 may correspond to the operations of block 502 of FIG. 5. In some aspects, the operations of blocks 702-706 may correspond to the operations of block 606 of FIG. 6.

At block 708, the apparatus sends a power headroom report based on (e.g., including) the power headroom determined at block 706. In some aspects, the operations of block 708 may correspond to the operations of block 410 of FIG. 4.

In some aspects, a process in accordance with the teachings herein may include any combination of the above operations.

Triggering Power Headroom Reporting

Power headroom reporting may be triggered in different ways in different implementations. For example, 3GPP TS 38.321 section 5.4.6 specifies that a power headroom report (PHR) shall be triggered if any of the following events occur: (1) phr-ProhibitTimer expires or has expired and the path loss has changed more than phr-Tx-PowerFactor-Change dB for at least one activated serving cell of any media access control (MAC) entity which is used as a pathloss reference since the last transmission of a PHR in this MAC entity when the MAC entity has UL resources for new transmission, where the path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between; (2) phr-PeriodicTimer expires; (3) upon configuration or reconfiguration of the power headroom reporting functionality by upper layers, which is not used to disable the function; (4) activation of an SCell of any MAC entity with configured uplink; (5) addition of the PSCell (i.e., PSCell is newly added or changed); (6) phr-ProhibitTimer expires or has expired, when the MAC entity has UL resources for new transmission, and the following is true for any of the activated Serving Cells of any MAC entity with configured uplink: there are UL resources allocated for transmission or there is a PUCCH transmission on this cell, and the required power backoff due to power management (as allowed by P-MPRc as specified in TS 38.101) for this cell has changed more than phr-Tx-PowerFactorChange dB since the last transmission of a PHR when the MAC entity had UL resources allocated for transmission or PUCCH transmission on this cell.

Other types of reporting triggers could be used in accordance with the teachings herein. For example, power headroom reporting could be triggered based on one or more of the conditions described herein (e.g., selection of a different beam and/or UE mobility).

In some aspects, a power headroom report may be triggered when the path loss changes (e.g., by more than a configured threshold) as a result of a beam switch. For example, a UE may initially elect to use a pseudo-omni-directional beam for Rx/Tx (beam 1). At this point, the UE sends a PHR corresponding to beam 1 (e.g., this report can be triggered based on PSCell add discussed above). Subsequently, the UE may conduct a beam refinement operation and thereby identify a directional beam (beam 2). At this point, the UE may trigger a PHR on the basis that the path loss has changed by a defined (e.g., relatively significant) amount. For example, the path loss based on beam 2 may be significantly smaller than the path loss on beam 1.

As another example, the UE may subsequently determine that it has high mobility (e.g., high rotation, etc.). In this case, the UE may designate beam 2 as being inappropriate for transmission. The UE can then trigger a PHR on the basis of the path loss change (e.g., the path loss may now be derived from beam 1 instead of beam 2).

Figure 8:
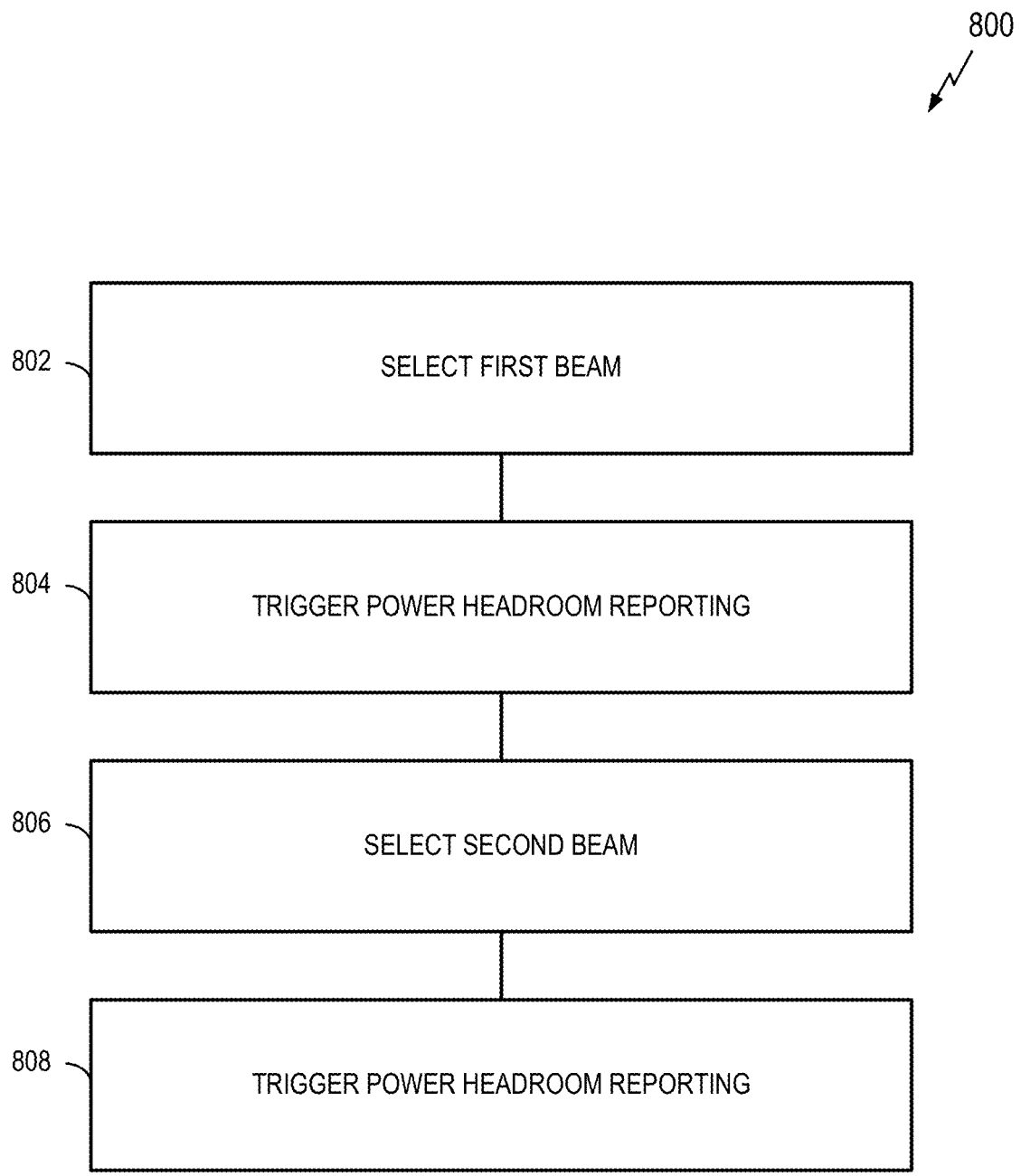
FIG. 8 is a flowchart illustrating an example of a process for triggering power headroom reporting in accordance with some aspects of the disclosure.
Figure 9:
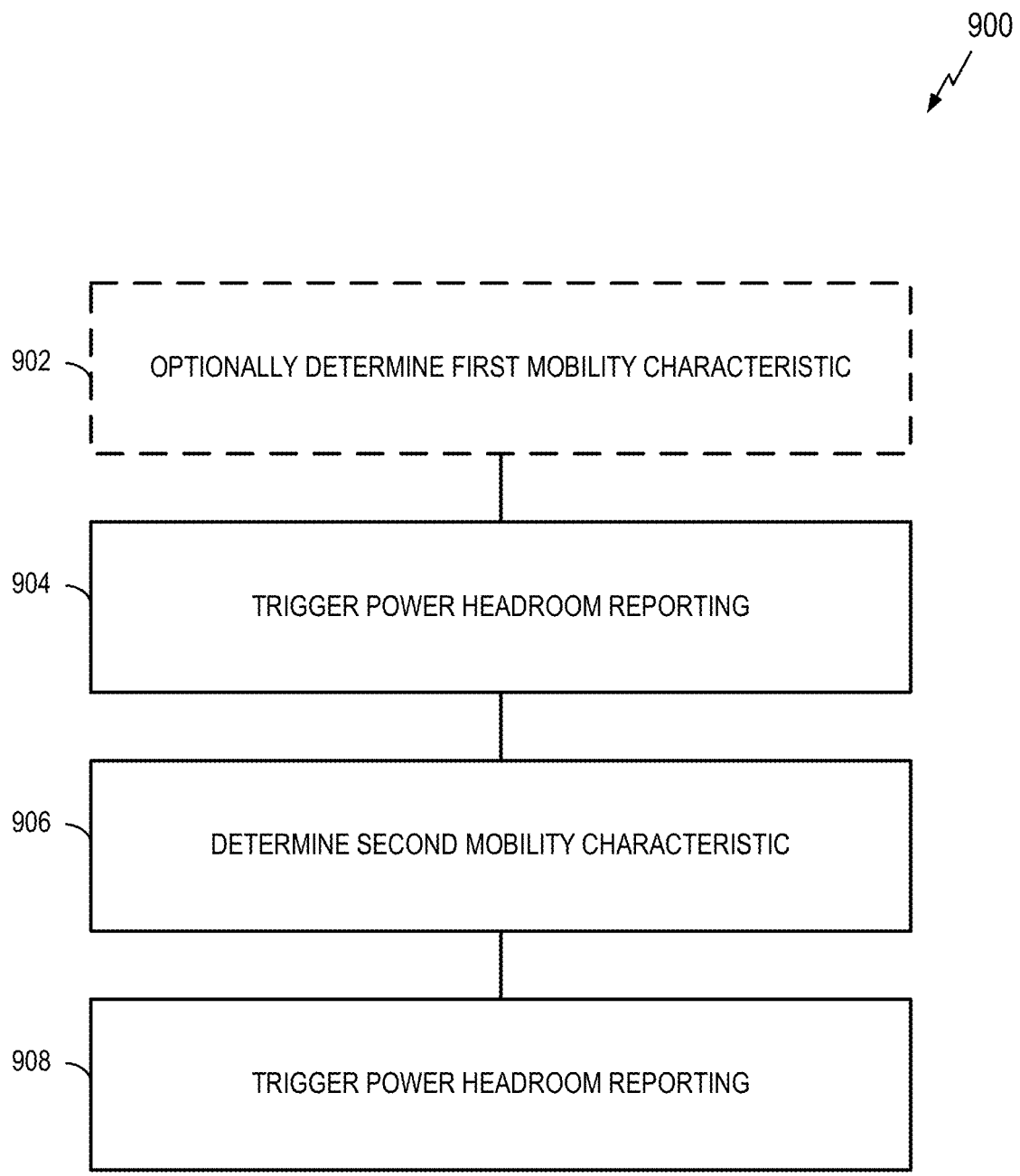
FIG. 9 is a flowchart illustrating another example of a process for triggering power headroom reporting in accordance with some aspects of the disclosure.

FIGS. 8 and 9 describe several example operations that may be performed to trigger power headroom reporting in accordance with the teachings herein. The operations of FIG. 8 relate to a trigger that is based on a beam switch. The operations of FIG. 9 relate to a trigger that is based on a change of mobility.

FIG. 8 illustrates a process 800 for communication in accordance with some aspects of the disclosure. The process 800 may take place within a processing circuit (e.g., the processing circuit 1010 of FIG. 10 or the processing circuit 1210 of FIG. 12), which may be located in a UE, an access terminal, a gNB, a TRP, a base station, or some other suitable apparatus. Of course, in various aspects within the scope of the disclosure, the process 800 may be implemented by any suitable apparatus capable of supporting communication-related operations.

At block 802, an apparatus (e.g., a UE) selects a first beam. For example, a UE may select an omni-directional beam as the basis for power headroom reporting.

At block 804, the apparatus triggers power headroom reporting (e.g., to a gNB). For example, the sending of a PHR may be based on PSCell add discussed above or some other trigger.

At block 806, the apparatus selects a second beam. For example, the UE may select a directional beam as the basis for power headroom reporting.

At block 808, the apparatus triggers power headroom reporting (e.g., to a gNB). In this case, the reporting may be triggered as a result of the selection of the second beam at block 806. For example, a PHR may be triggered if the path loss associated with the second beam is less than the path loss associated with the first beam by at least a threshold amount.

FIG. 9 illustrates a process 900 for communication in accordance with some aspects of the disclosure. The process 900 may take place within a processing circuit (e.g., the processing circuit 1010 of FIG. 10 or the processing circuit 1210 of FIG. 12), which may be located in a UE, an access terminal, a gNB, a TRP, a base station, or some other suitable apparatus. Of course, in various aspects within the scope of the disclosure, the process 900 may be implemented by any suitable apparatus capable of supporting communication-related operations.

At optional block 902, an apparatus (e.g., a UE) may determine a first mobility characteristic (e.g., of the apparatus). For example, a UE may determine that it currently has relatively low mobility.

At block 904, the apparatus the apparatus triggers power headroom reporting (e.g., to a gNB). For example, the sending of a PHR may be based on PSCell add discussed above or some other trigger (e.g., a beam switch, or a change of mobility).

At block 906, the apparatus determines a second mobility characteristic (e.g., of the apparatus). For example, a UE may determine that it now has relatively high mobility. In conjunction with (e.g., as a result of) this determination, the UE may select a different beam (e.g., a wider beam) as the basis for power headroom reporting.

At block 908, the apparatus triggers power headroom reporting (e.g., to a gNB). In this case, the reporting may be triggered as a result of the determination of the second mobility characteristic (e.g., a change in mobility) at block 906. For example, a PHR may be triggered if the path loss associated with a beam selected at block 906 is less than the path loss associated with the beam used for the reporting of block 904 by at least a threshold amount.

First Example Apparatus

Figure 10:
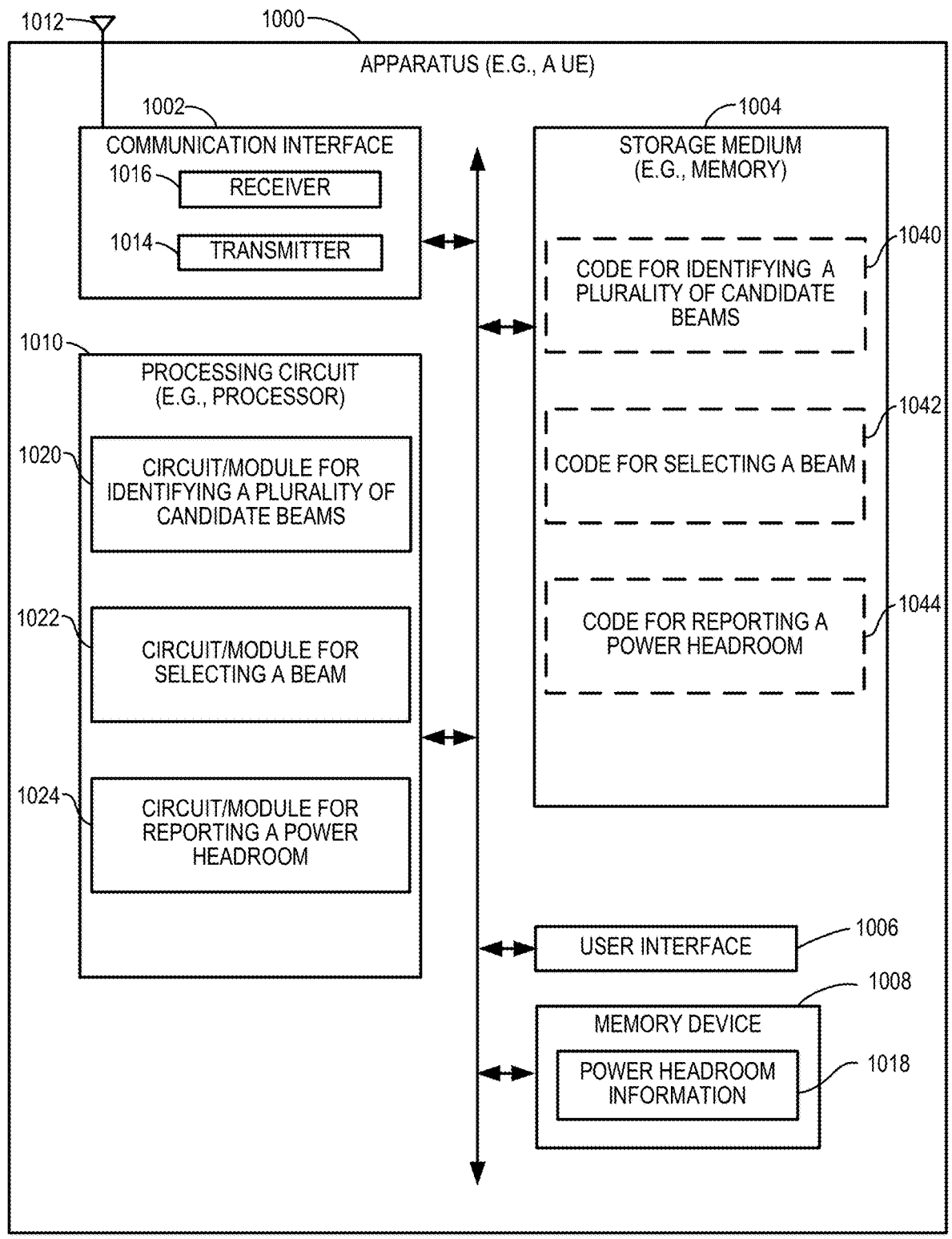
FIG. 10 is a block diagram illustrating an example hardware implementation for an apparatus (e.g., an electronic device) that can support communication in accordance with some aspects of the disclosure.

FIG. 10 illustrates a block diagram of an example hardware implementation of an apparatus 1000 configured to communicate according to one or more aspects of the disclosure. The apparatus 1000 could embody or be implemented within a UE, a gNB, a transmit receive point (TRP), a base station (BS), an eNode B (eNB), a customer premises equipment (CPE), or some other type of device that supports wireless communication. In various implementations, the apparatus 1000 could embody or be implemented within an access terminal, an access point, or some other type of device. In various implementations, the apparatus 1000 could embody or be implemented within a server, a personal computer, a mobile phone, a smart phone, a tablet, a portable computer, a sensor, an alarm, a vehicle, a machine, an entertainment device, a medical device, or any other electronic device having circuitry. In some implementations, the apparatus 1000 may correspond to the UE 102, the UE 104, or some other component of FIG. 1.

The apparatus 1000 includes a communication interface (e.g., at least one transceiver) 1002, a storage medium 1004, a user interface 1006, a memory device (e.g., a memory circuit) 1008, and a processing circuit 1010 (e.g., at least one processor). In various implementations, the user interface 1006 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 10. The signaling bus may include any number of interconnecting buses and bridges depending on the specific application of the processing circuit 1010 and the overall design constraints. The signaling bus links together various circuits such that each of the communication interface 1002, the storage medium 1004, the user interface 1006, and the memory device 1008 are coupled to and/or in electrical communication with the processing circuit 1010. The signaling bus may also link various other circuits (not shown) such as timing sources, peripherals, voltage regulators, and power management circuits, which are well known in the art, and therefore, will not be described any further.

The communication interface 1002 provides a means for communicating with other apparatuses over a transmission medium. In some implementations, the communication interface 1002 includes circuitry and/or programming adapted to facilitate the communication of information bi-directionally with respect to one or more communication devices in a network. In some implementations, the communication interface 1002 is adapted to facilitate wireless communication of the apparatus 1000. In these implementations, the communication interface 1002 may be coupled to one or more antennas 1012 as shown in FIG. 10 for wireless communication within a wireless communication system. In some implementations, the communication interface 1002 may be configured for wire-based communication. For example, the communication interface 1002 could be a bus interface, a send/receive interface, or some other type of signal interface including drivers, buffers, or other circuitry for outputting and/or obtaining signals (e.g., outputting signal from and/or receiving signals into an integrated circuit). The communication interface 1002 can be configured with one or more standalone receivers and/or transmitters, as well as one or more transceivers. In the illustrated example, the communication interface 1002 includes a transmitter 1014 and a receiver 1016. The communication interface 1002 serves as one example of a means for receiving and/or means transmitting.

The memory device 1008 may represent one or more memory devices. As indicated, the memory device 1008 may maintain power headroom information 1018 along with other information used by the apparatus 1000. In some implementations, the memory device 1008 and the storage medium 1004 are implemented as a common memory component. The memory device 1008 may also be used for storing data that is manipulated by the processing circuit 1010 or some other component of the apparatus 1000.

The storage medium 1004 may represent one or more computer-readable, machine-readable, and/or processor-readable devices for storing programming, such as processor executable code or instructions (e.g., software, firmware), electronic data, databases, or other digital information. The storage medium 1004 may also be used for storing data that is manipulated by the processing circuit 1010 when executing programming. The storage medium 1004 may be any available media that can be accessed by a general purpose or special purpose processor, including portable or fixed storage devices, optical storage devices, and various other mediums capable of storing, containing or carrying programming.

By way of example and not limitation, the storage medium 1004 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1004 may be embodied in an article of manufacture (e.g., a computer program product). By way of example, a computer program product may include a computer-readable medium in packaging materials. In view of the above, in some implementations, the storage medium 1004 may be a non-transitory (e.g., tangible) storage medium. For example, the storage medium 1004 may be a non-transitory computer-readable medium storing computer-executable code, including code to perform operations as described herein.

The storage medium 1004 may be coupled to the processing circuit 1010 such that the processing circuit 1010 can read information from, and write information to, the storage medium 1004. That is, the storage medium 1004 can be coupled to the processing circuit 1010 so that the storage medium 1004 is at least accessible by the processing circuit 1010, including examples where at least one storage medium is integral to the processing circuit 1010 and/or examples where at least one storage medium is separate from the processing circuit 1010 (e.g., resident in the apparatus 1000, external to the apparatus 1000, distributed across multiple entities, etc.).

Programming stored by the storage medium 1004, when executed by the processing circuit 1010, causes the processing circuit 1010 to perform one or more of the various functions and/or process operations described herein. For example, the storage medium 1004 may include operations configured for regulating operations at one or more hardware blocks of the processing circuit 1010, as well as to utilize the communication interface 1002 for wireless communication utilizing their respective communication protocols.

The processing circuit 1010 is generally adapted for processing, including the execution of such programming stored on the storage medium 1004. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1010 is arranged to obtain, process and/or send data, control data access and storage, issue commands, and control other desired operations. The processing circuit 1010 may include circuitry configured to implement desired programming provided by appropriate media in at least one example. For example, the processing circuit 1010 may be implemented as one or more processors, one or more controllers, and/or other structure configured to execute executable programming Examples of the processing circuit 1010 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1010 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1010 are for illustration and other suitable configurations within the scope of the disclosure are also contemplated.

According to one or more aspects of the disclosure, the processing circuit 1010 may be adapted to perform any or all of the features, processes, functions, operations and/or routines for any or all of the apparatuses described herein. For example, the processing circuit 1010 may be configured to perform any of the steps, functions, and/or processes described with respect to FIGS. 1-9, 11, and 13-19. As used herein, the term "adapted" in relation to the processing circuit 1010 may refer to the processing circuit 1010 being one or more of configured, employed, implemented, and/or programmed to perform a particular process, function, operation and/or routine according to various features described herein.

The processing circuit 1010 may be a specialized processor, such as an application-specific integrated circuit (ASIC) that serves as a means for (e.g., structure for) carrying out any one of the operations described in conjunction with FIGS. 1-9, 11, and 13-19. The processing circuit 1010 serves as one example of a means for transmitting and/or a means for receiving. In various implementations, the processing circuit 1010 may provide and/or incorporate, at least in part, the functionality described above for the second apparatus 204 (e.g., the communication controller 214 and/or the P-H controller 222) of FIG. 2.

According to at least one example of the apparatus 1000, the processing circuit 1010 may include one or more of a circuit/module for identifying a plurality of candidate beams 1020, a circuit/module for selecting a beam 1022, or a circuit/module for reporting a power headroom 1024. In various implementations, the circuit/module for identifying a plurality of candidate beams 1020, the circuit/module for selecting a beam 1022, or the circuit/module for reporting a power headroom 1024 may provide and/or incorporate, at least in part, the functionality described above for the second apparatus 204 (e.g., the communication controller 214 and/or the P-H controller 222) of FIG. 2.

As mentioned above, programming stored by the storage medium 1004, when executed by the processing circuit 1010, causes the processing circuit 1010 to perform one or more of the various functions and/or process operations described herein. For example, the programming may cause the processing circuit 1010 to perform the various functions, steps, and/or processes described herein with respect to FIGS. 1-9, 11, and 13-19 in various implementations. As shown in FIG. 10, the storage medium 1004 may include one or more of code for identifying a plurality of candidate beams 1040, code for selecting a beam 1042, or code for reporting a power headroom 1044. In various implementations, the code for identifying a plurality of candidate beams 1040, the code for selecting a beam 1042, or the code for reporting a power headroom 1044 may be executed or otherwise used to provide the functionality described herein for the circuit/module for identifying a plurality of candidate beams 1020, the circuit/module for selecting a beam 1022, or the circuit/module for reporting a power headroom 1024.

The circuit/module for identifying a plurality of candidate beams 1020 may include circuitry and/or programming (e.g., code for identifying a plurality of candidate beams 1040 stored on the storage medium 1004) adapted to perform several functions relating to, for example, identifying beams that could be used for wireless communication as discussed herein (e.g., based on whether a beam can close a link to another apparatus). In some aspects, the circuit/module for identifying a plurality of candidate beams 1020 (e.g., a means for identifying a plurality of candidate beams) may correspond to, for example, a processing circuit.

The circuit/module for selecting a beam 1022 may include circuitry and/or programming (e.g., code for selecting a beam 1042 stored on the storage medium 1004) adapted to perform several functions relating to, for example, selecting a particular beam to be used for wireless communication (e.g., from a plurality of candidate beams) as discussed herein (e.g., based on power consumption, mobility, or some other criterion). In some aspects, the circuit/module for selecting a beam 1022 (e.g., a means for selecting a beam) may correspond to, for example, a processing circuit.

The circuit/module for reporting a power headroom 1024 (e.g., a circuit/module for sending) may include circuitry and/or programming (e.g., code for reporting a power headroom 1044 (or code for sending) stored on the storage medium 1004) adapted to perform several functions relating to, for example, sending a power headroom report as discussed herein. In some aspects, the circuit/module for reporting a power headroom 1024 (e.g., a means for reporting a power headroom or a means for sending) may correspond to, for example, a processing circuit and/or a communication circuit (e.g., including a transmitter).

First Example Process

Figure 11:
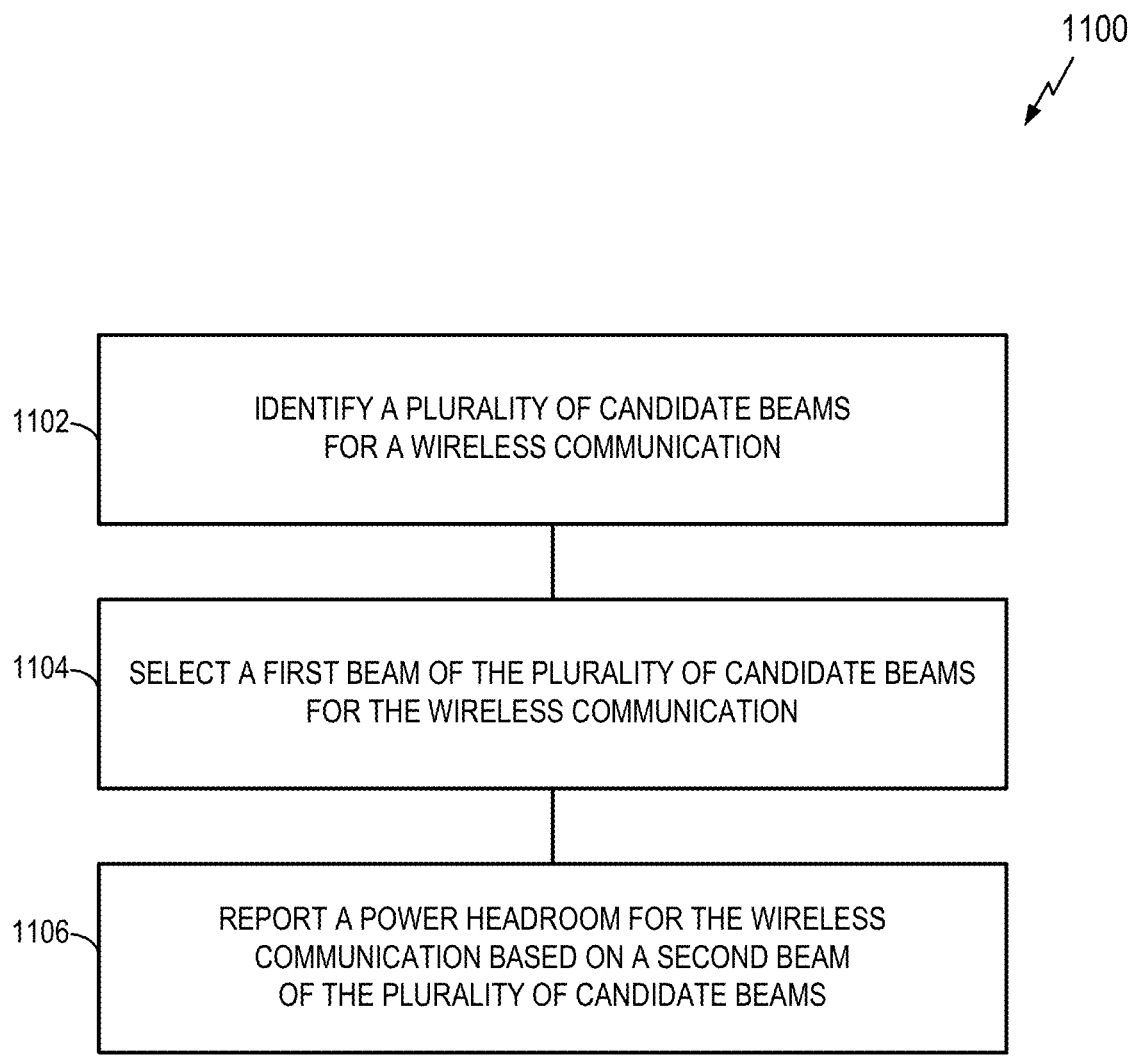
FIG. 11 is a flowchart illustrating an example of a process for reporting a power headroom in accordance with some aspects of the disclosure.

FIG. 11 illustrates a process 1100 for communication in accordance with some aspects of the disclosure. The process 1100 may take place within a processing circuit (e.g., the processing circuit 1010 of FIG. 10 or the processing circuit 1210 of FIG. 12), which may be located in a UE, an access terminal, a gNB, a TRP, a base station, or some other suitable apparatus. Of course, in various aspects within the scope of the disclosure, the process 1100 may be implemented by any suitable apparatus capable of supporting communication-related operations.

At block 1102, an apparatus (e.g., a UE) identifies a plurality of candidate beams for a wireless communication. For example, a UE may determine that an omni-directional beam, one or more sector beams, and one or more narrow beams are suitable for communicating with another apparatus (e.g., a gNB). Other types of candidate beams (e.g., with different beam widths and/or other beam characteristics) may be identified in other examples. In some aspects, the plurality of candidate beams is identified for communication associated with a particular spatial reference of another apparatus (e.g., a gNB). For example, the apparatus may identify each beam that it could potentially use to transmit to the gNB on resources associated with a particular set of spatial reference parameters (e.g., a reference signal) broadcast or otherwise associated with the gNB. Such a reference signal may include, for example, an indication of a synchronization signal block (SSB), a channel state information reference signal (CSI-RS), or some other type of spatial-related information. In some aspects, the operations of block 1102 may correspond to the operations of block 402 of FIG. 4.

In some implementations, the circuit/module for identifying a plurality of candidate beams 1020 of FIG. 10 performs the operations of block 1102 and/or other similar operations as taught herein. In some implementations, the code for identifying a plurality of candidate beams 1040 of FIG. 10 is executed to perform the operations of block 1102 and/or other similar operations as taught herein.

At block 1104, the apparatus selects a first beam of the plurality of candidate beams for the wireless communication. For example, the UE may elect to use a wider beam (e.g., the omni-directional beam) for communicating with the gNB based on at least one criterion. In some scenarios, the UE may select the first beam for the wireless communication if the first beam has lower power consumption than another beam. In some scenarios, the UE may select the first beam for the wireless communication based on mobility of the apparatus (e.g., a wider beam may be selected if the mobility is high). Other selection criteria may be used in accordance with the teachings herein. In some aspects, the operations of block 1104 may correspond to the operations of blocks 404 and 406 of FIG. 4.

In some implementations, the circuit/module for selecting a beam 1022 of FIG. 10 performs the operations of block 1104 and/or other similar operations as taught herein. In some implementations, the code for selecting a beam 1042 of FIG. 10 is executed to perform the operations of block 1104 and/or other similar operations as taught herein.

At block 1106, the apparatus reports a power headroom for the wireless communication based on a second beam of the plurality of candidate beams. For example, the UE may elect to use the power headroom associated with one of the narrower beams for a power headroom report to the gNB. As another example, the UE may elect to use the power headroom associated with one of the narrower beams and at least one other beam for a power headroom report to the gNB. In some aspects, the operations of block 1106 may correspond to the operations of blocks 408 and 410 of FIG. 4.

The power headroom to be reported may be determined in different ways in different implementations. In some aspects, the process 1100 may include determining the power headroom based on at least one of: the first beam or another beam of the plurality of candidate beams. For example, the apparatus may calculate the power head room based on one or more parameters (e.g., transmit power) associated with the second beam and one or more parameters associated with the first beam. As another example, the process 1100 may include calculating the power head room based on one or more parameters associated with the second beam and one or more parameters associated with the first beam and/or at least one other beam of the plurality of candidate beams. Other schemes for determining the power headroom to be reported may be used in accordance with the teachings herein.

In some implementations, the circuit/module for reporting a power headroom 1024 of FIG. 10 performs the operations of block 1106 and/or other similar operations as taught herein. In some implementations, the code for reporting a power headroom 1044 of FIG. 10 is executed to perform the operations of block 1106 and/or other similar operations as taught herein.

The selection of the first beam may be performed in different ways in different implementations. In some aspects, the selection of the first beam may be based on at least one first criterion. In some aspects, the process 1100 may include selecting the first beam based on a first power consumption associated with the first beam and a second power consumption associated with the second beam (e.g., where the first power consumption is lower than the second power consumption). In some aspects, the process 1100 may include selecting the first beam based on a first per-antenna element power consumption associated with the first beam and a second per-antenna element power consumption associated with the second beam. In some aspects, the process 1100 may include selecting the first beam based on mobility of the apparatus. In some aspects, the mobility may include (e.g., may be) rotation, movement, or rotation and movement.

In some aspects, the process 1100 may include selecting the second beam based on at least one second criterion that is different from the at least one first criterion. In some aspects, the at least one first criterion may include one or more of power consumption of the apparatus, beam width, mobility of the apparatus, or other factors. In some aspects, the at least one second criterion may include beam width, mobility of the apparatus, power headroom associated with one or more beams, reference signal received power (RSRP), path loss, or any combination of these or other factors.

The selection of the second beam may be performed in different ways in different implementations. In some aspects, the process 1100 may include selecting the second beam based on a first power headroom associated with the first beam and a second power headroom associated with the second beam. In some aspects, the selection of the second beam may include determining that the second power headroom is higher than the first power headroom. For example, the apparatus may identify at least one beam that has a higher power headroom than the first beam. In some aspects, the process 1100 may include selecting the second beam based on a first RSRP associated with the first beam and a second RSRP associated with the second beam. In some aspects, the selection of the second beam may include determining that the second RSRP is higher than the first RSRP. For example, the apparatus may identify at least one beam that has a higher RSRP than the first beam. In some aspects, the process 1100 may include selecting the second beam based on a first path loss associated with the first beam and a second path loss associated with the second beam. In some aspects, the selection of the second beam may include determining that the second path loss is lower than the first path loss. For example, the apparatus may identify at least one beam that has a lower path loss than the first beam. In some aspects, the process 1100 may include selecting the second beam based on a first width of the first beam and a second width of the second beam (e.g. where the second width is narrower than the first width). For example, the process 1100 may include: determining that a beam width of the second beam is narrower than a beam width of the first beam, and selecting the second beam as a basis for the power headroom for the wireless communication as a result of the determination. In some aspects, the process 1100 may include selecting the second beam based on mobility of the apparatus. In some aspects, the mobility may include (e.g., may be) rotation, movement, or rotation and movement.

In some aspects, the process 1100 may include triggering the reporting of the power headroom. This triggering may be based on different criteria in different implementations. In some aspects, the process 1100 may include triggering the reporting of the power headroom based on the selection of the second beam. In some aspects, the process 1100 may include triggering the reporting of the power headroom based on a first path loss associated with the first beam and a second path loss associated with the second beam. In some aspects, the process 1100 may include triggering the reporting of the power headroom based on a change in mobility of the apparatus.

In some aspects, a process in accordance with the teachings herein may include any combination of the above operations.

Second Example Apparatus

Figure 12:
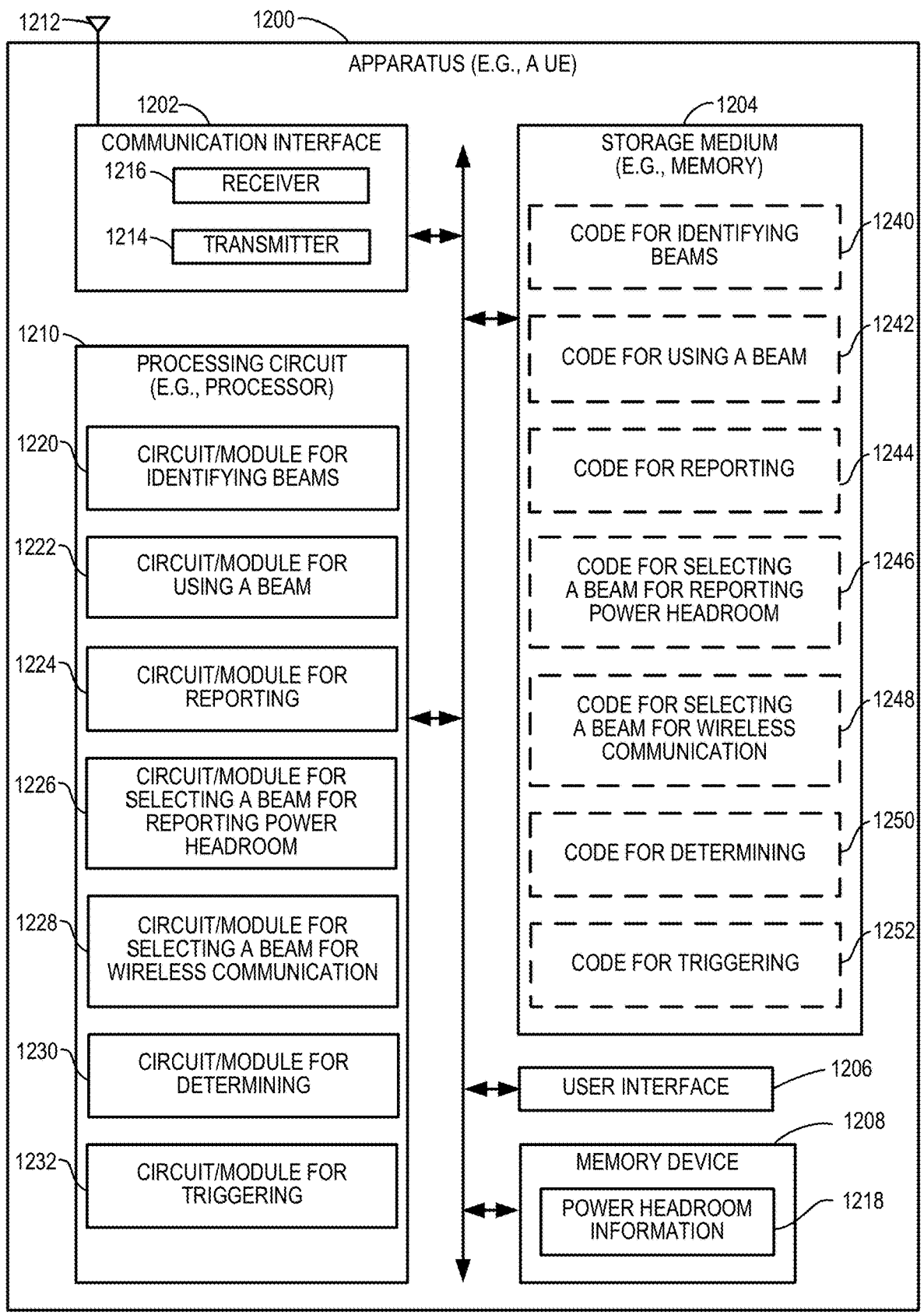
FIG. 12 is a block diagram illustrating an example hardware implementation for an apparatus (e.g., an electronic device) that can support communication in accordance with some aspects of the disclosure.

FIG. 12 illustrates a block diagram of an example hardware implementation of an apparatus 1200 configured to communicate according to one or more aspects of the disclosure. The apparatus 1200 could embody or be implemented within a UE, a gNB, a transmit receive point (TRP), a base station (BS), an eNode B (eNB), a customer premises equipment (CPE), or some other type of device that supports wireless communication. In various implementations, the apparatus 1200 could embody or be implemented within an access terminal, an access point, or some other type of device. In various implementations, the apparatus 1200 could embody or be implemented within a server, a personal computer, a mobile phone, a smart phone, a tablet, a portable computer, a sensor, an alarm, a vehicle, a machine, an entertainment device, a medical device, or any other electronic device having circuitry. In some implementations, the apparatus 1200 may correspond to the UE 102, the UE 104, or some other component of FIG. 1.

The apparatus 1200 includes a communication interface (e.g., at least one transceiver) 1202, a storage medium 1204, a user interface 1206, a memory device 1208 (e.g., storing power headroom information 1218), and a processing circuit 1210 (e.g., at least one processor). In various implementations, the user interface 1206 may include one or more of: a keypad, a display, a speaker, a microphone, a touchscreen display, of some other circuitry for receiving an input from or sending an output to a user. The communication interface 1202 may be coupled to one or more antennas 1212, and may include a transmitter 1214 and a receiver 1216. In general, the components of FIG. 12 may be similar to corresponding components of the apparatus 1000 of FIG. 10.

According to one or more aspects of the disclosure, the processing circuit 1210 may be adapted to perform any or all of the features, processes, functions, operations and/or routines for any or all of the apparatuses described herein. For example, the processing circuit 1210 may be configured to perform any of the steps, functions, and/or processes described with respect to FIGS. 1-9, 11, and 13-19. As used herein, the term "adapted" in relation to the processing circuit 1210 may refer to the processing circuit 1210 being one or more of configured, employed, implemented, and/or programmed to perform a particular process, function, operation and/or routine according to various features described herein.

The processing circuit 1210 may be a specialized processor, such as an application-specific integrated circuit (ASIC) that serves as a means for (e.g., structure for) carrying out any one of the operations described in conjunction with FIGS. 1-9, 11, and 13-19. The processing circuit 1210 serves as one example of a means for transmitting and/or a means for receiving. In various implementations, the processing circuit 1210 may provide and/or incorporate, at least in part, the functionality described above for the second apparatus 204 (e.g., the communication controller 214 and/or the P-H controller 222) of FIG. 2.

According to at least one example of the apparatus 1200, the processing circuit 1210 may include one or more of a circuit/module for identifying beams 1220, a circuit/module for using a beam 1222, a circuit/module for reporting 1224, a circuit/module for selecting a beam for reporting power headroom 1226, a circuit/module for selecting a beam for wireless communication 1228, a circuit/module for determining 1230, or a circuit/module for triggering 1232. In various implementations, the circuit/module for identifying beams 1220, the circuit/module for using a beam 1222, the circuit/module for reporting 1224, the circuit/module for selecting a beam for reporting power headroom 1226, the circuit/module for selecting a beam for wireless communication 1228, the circuit/module for determining 1230, or the circuit/module for triggering 1232 may provide and/or incorporate, at least in part, the functionality described above for the second apparatus 204 (e.g., the communication controller 214 and/or the P-H controller 222) of FIG. 2.

As mentioned above, programming stored by the storage medium 1204, when executed by the processing circuit 1210, causes the processing circuit 1210 to perform one or more of the various functions and/or process operations described herein. For example, the programming may cause the processing circuit 1210 to perform the various functions, steps, and/or processes described herein with respect to FIGS. 1-9, 11, and 13-19 in various implementations. As shown in FIG. 12, the storage medium 1204 may include one or more of code for identifying beams 1240, code for using a beam 1242, code for reporting 1244, code for selecting a beam for reporting power headroom 1246, code for selecting a beam for wireless communication 1248, code for determining 1250, or code for triggering 1252. In various implementations, the code for identifying beams 1240, the code for using a beam 1242, the code for reporting 1244, the code for selecting a beam for reporting power headroom 1246, the code for selecting a beam for wireless communication 1248, the code for determining 1250, or the code for triggering 1252 may be executed or otherwise used to provide the functionality described herein for the circuit/module for identifying beams 1220, the circuit/module for using a beam 1222, the circuit/module for reporting 1224, the circuit/module for selecting a beam for reporting power headroom 1226, the circuit/module for selecting a beam for wireless communication 1228, the circuit/module for determining 1230, or the circuit/module for triggering 1232.

The circuit/module for identifying beams 1220 may include circuitry and/or programming (e.g., code for identifying beams 1240 stored on the storage medium 1204) adapted to perform several functions relating to, for example, identifying beams that could be used for wireless communication as discussed herein (e.g., based on whether a beam can close a link to another apparatus). In some aspects, the circuit/module for identifying beams 1220 (e.g., a means for identifying beams) may correspond to, for example, a processing circuit.

The circuit/module for using a beam 1222 may include circuitry and/or programming (e.g., code for using a beam 1242 stored on the storage medium 1204) adapted to perform several functions relating to, for example, using a particular beam for wireless communication as discussed herein (e.g., to communicate with a base station). In some aspects, the circuit/module for using a beam 1222 (e.g., a means for using a beam) may correspond to, for example, a processing circuit.

The circuit/module for reporting a power headroom 1224 may include circuitry and/or programming (e.g., code for reporting a power headroom 1244 stored on the storage medium 1204) adapted to perform several functions relating to, for example, sending a power headroom report as discussed herein. In some aspects, the circuit/module for reporting a power headroom 1224 (e.g., a means for reporting a power headroom) may correspond to, for example, a processing circuit.

The circuit/module for selecting a beam for reporting power headroom 1226 may include circuitry and/or programming (e.g., code for selecting a beam for reporting power headroom 1246 stored on the storage medium 1204) adapted to perform several functions relating to, for example, selecting one or more beams (e.g., from a plurality of candidate beams) to be used for reporting power headroom as discussed herein (e.g., based on power headroom, mobility, reference signal received power (RSRP), path loss, or some other criterion). In some aspects, the circuit/module for selecting a beam for reporting power headroom 1226 (e.g., a means for selecting a beam for reporting power headroom) may correspond to, for example, a processing circuit.

The circuit/module for selecting a beam for wireless communication 1228 may include circuitry and/or programming (e.g., code for selecting a beam for wireless communication 1248 stored on the storage medium 1004) adapted to perform several functions relating to, for example, selecting a particular beam to be used for wireless communication (e.g., from a plurality of candidate beams) as discussed herein (e.g., based on power consumption, mobility, or some other criterion). In some aspects, the circuit/module for selecting a beam for wireless communication 1228 (e.g., a means for selecting a beam for wireless communication) may correspond to, for example, a processing circuit.

The circuit/module for determining 1230 may include circuitry and/or programming (e.g., code for determining 1250 stored on the storage medium 1204) adapted to perform several functions relating to, for example, performing a determining operation as discussed herein. In some implementations, the circuit/module for determining 1230 may determine a power headroom associated with a beam (e.g., based on the equation set forth above, based on downlink measurements, based on filtering (e.g., averaging or weighted combining), or other techniques). Alternatively or in addition, the circuit/module for determining 1230 may determine power consumption associated with a beam (e.g., by calculating the power consumption of the antenna elements that would be used to generate the beam). Alternatively or in addition, the circuit/module for determining 1230 may determine mobility of an apparatus (e.g., based on location information obtained via global positioning system (GPS) location tracking, network-based location tracking, or other locating techniques). Alternatively or in addition, the circuit/module for determining 1230 may determine a width associated with a beam (e.g., based on a specified antenna configuration (which may include, for example, spatial reference parameters, the antenna elements and settings used to generate the beam, etc.)). Alternatively or in addition, the circuit/module for determining 1230 may determine a condition (e.g., that a different beam has been selected, that the path losses of two beams differ, that mobility of the apparatus has changed, etc.). Alternatively or in addition, the circuit/module for determining 1230 may determine a difference (e.g., between path loss values or some other quantities). Alternatively or in addition, the circuit/module for determining 1230 may determine that a difference is greater than or equal to a threshold (e.g., by subtracting a difference value from a threshold value). In some implementations, the apparatus 1200 may include multiple circuit/modules for determining 1230 for performing different determining operations. In some aspects, the circuit/module for determining 1230 (e.g., a means for determining) may correspond to, for example, a processing circuit.

The circuit/module for triggering 1232 may include circuitry and/or programming (e.g., code for triggering 1252 stored on the storage medium 1204) adapted to perform several functions relating to, for example, triggering the reporting of power headroom as discussed herein (e.g., based on the selection of a second beam, based on path loss, based on a change in mobility of the apparatus, etc.). In some aspects, the circuit/module for triggering 1232 (e.g., a means for triggering) may correspond to, for example, a processing circuit.

Second Example Process

Figure 13:
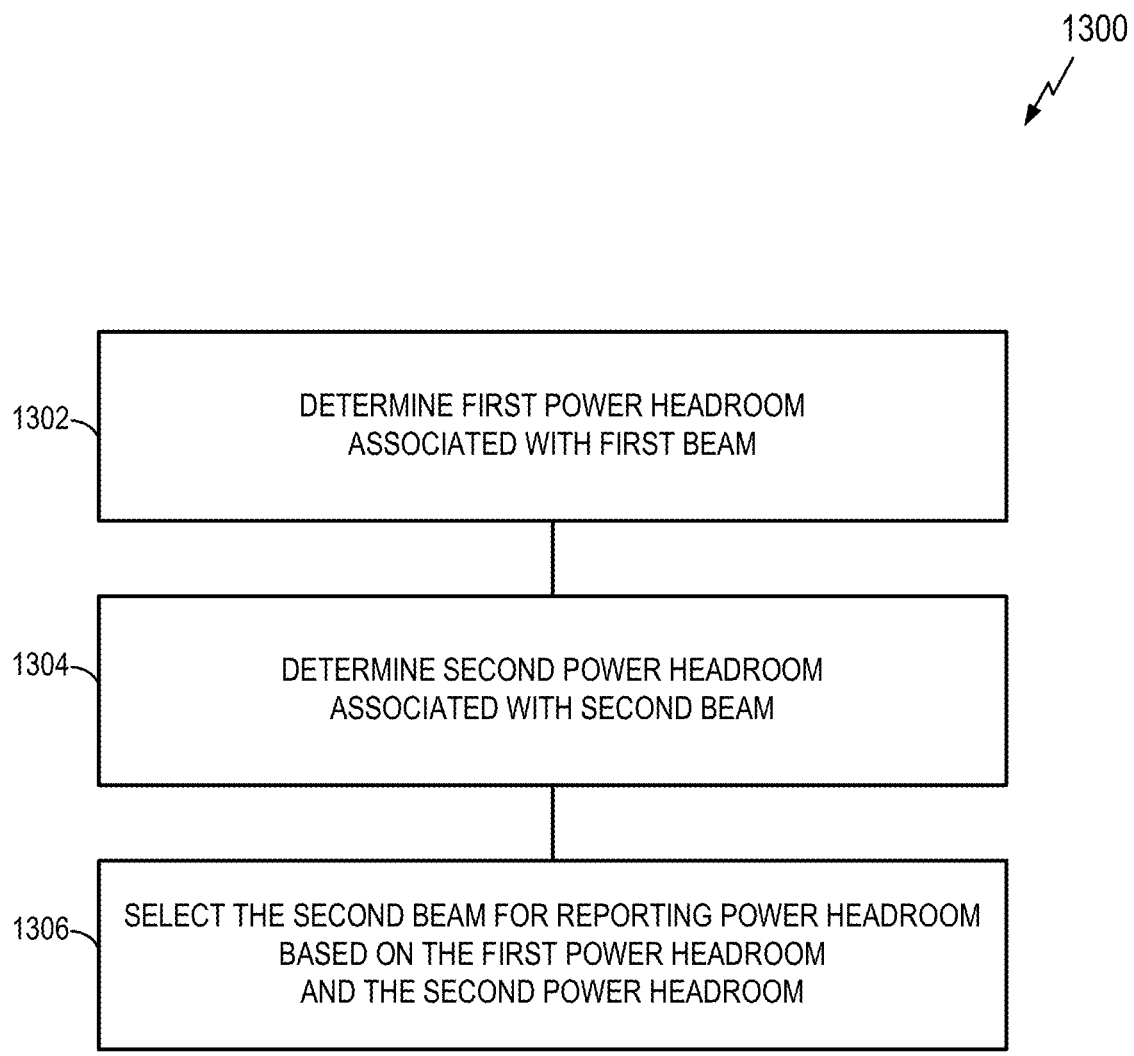
FIG. 13 is a flowchart illustrating an example of a process for selecting a beam for power headroom reporting in accordance with some aspects of the disclosure.

FIG. 13 illustrates a process 1300 for communication in accordance with some aspects of the disclosure. In some aspects, the process 1300 may be performed in conjunction with (e.g., as part of or in addition to) the process 1100 of FIG. 11. For example, one or more of the operations of the process 1300 may correspond in one or more aspects to the operations of block 1106 of FIG. 11. The process 1300 may take place within a processing circuit (e.g., the processing circuit 1010 of FIG. 10 or the processing circuit 1210 of FIG. 12), which may be located in a UE, an access terminal, a gNB, a TRP, a base station, or some other suitable apparatus. Of course, in various aspects within the scope of the disclosure, the process 1300 may be implemented by any suitable apparatus capable of supporting communication-related operations.

At block 1302, an apparatus (e.g., a UE) determines a first power headroom associated with a first beam. For example, a UE may determine the power headroom associated with an omni-directional beam.

In some implementations, the circuit/module for determining 1230 of FIG. 12 performs the operations of block 1302 and/or other similar operations as taught herein. In some implementations, the code for determining 1250 of FIG. 12 is executed to perform the operations of block 1302 and/or other similar operations as taught herein.

At block 1304, the apparatus determines a second power headroom associated with a second beam. For example, the UE may determine the power headroom associated with a narrow beam.

In some implementations, the circuit/module for determining 1230 of FIG. 12 performs the operations of block 1304 and/or other similar operations as taught herein. In some implementations, the code for determining 1250 of FIG. 12 is executed to perform the operations of block 1304 and/or other similar operations as taught herein.

At block 1306, the apparatus selects the second beam for reporting the power headroom based on the first power headroom and the second power headroom. For example, the apparatus may select the beam with the highest power headroom. Thus, the selection of the second beam may result from determining that the second power headroom is higher than the first power headroom.

In some implementations, the circuit/module for selecting a beam for reporting power headroom 1226 of FIG. 12 performs the operations of block 1306 and/or other similar operations as taught herein. In some implementations, the code for selecting a beam for reporting power headroom 1246 of FIG. 12 is executed to perform the operations of block 1306 and/or other similar operations as taught herein.

In some aspects, a process in accordance with the teachings herein may include any combination of the above operations.

Third Example Process

Figure 14:
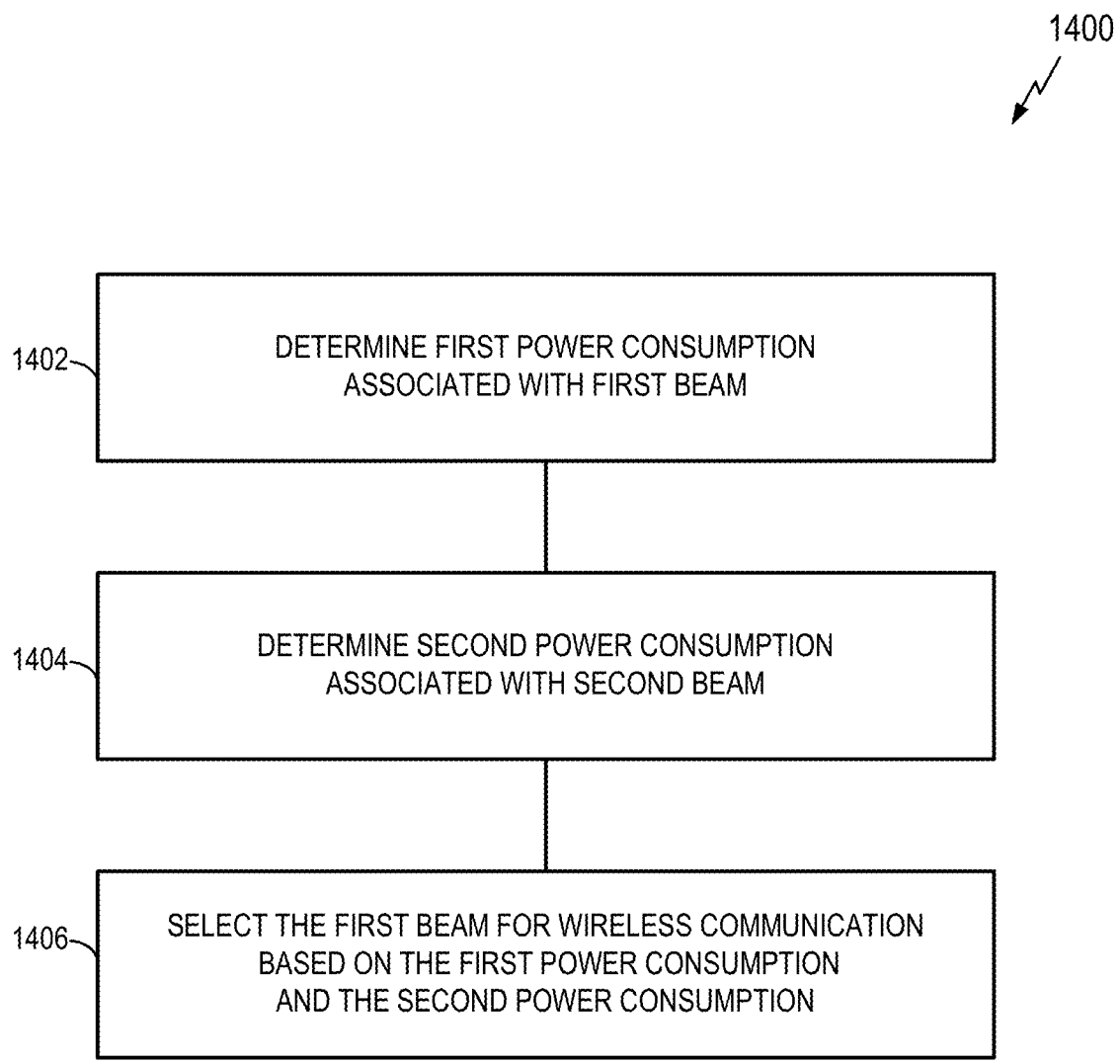
FIG. 14 is a flowchart illustrating an example of a process for selecting a beam for wireless communication based on power consumption in accordance with some aspects of the disclosure.

FIG. 14 illustrates a process 1400 for communication in accordance with some aspects of the disclosure. In some aspects, the process 1400 may be performed in conjunction with (e.g., as part of or in addition to) the process 1100 of FIG. 11. For example, one or more of the operations of the process 1400 may correspond in one or more aspects to the operations of block 1104 of FIG. 11. The process 1400 may take place within a processing circuit (e.g., the processing circuit 1010 of FIG. 10 or the processing circuit 1210 of FIG. 12), which may be located in a UE, an access terminal, a gNB, a TRP, a base station, or some other suitable apparatus. Of course, in various aspects within the scope of the disclosure, the process 1400 may be implemented by any suitable apparatus capable of supporting communication-related operations.

At block 1402, an apparatus (e.g., a UE) determines a first power consumption associated with a first beam. For example, a UE may determine the power consumption associated with an omni-directional beam. In some aspects, the first power consumption may be a per-antenna element power consumption.

In some implementations, the circuit/module for determining 1230 of FIG. 12 performs the operations of block 1402 and/or other similar operations as taught herein. In some implementations, the code for determining 1250 of FIG. 12 is executed to perform the operations of block 1402 and/or other similar operations as taught herein.

At block 1404, the apparatus determines a second power consumption associated with a second beam. For example, the UE may determine the power consumption associated with a narrow beam. In some aspects, the second power consumption may be a per-antenna element power consumption.

In some implementations, the circuit/module for determining 1230 of FIG. 12 performs the operations of block 1404 and/or other similar operations as taught herein. In some implementations, the code for determining 1250 of FIG. 12 is executed to perform the operations of block 1404 and/or other similar operations as taught herein.

At block 1406, the apparatus selects the first beam for wireless communication based on the first power consumption and the second power consumption. For example, the UE may select the beam with the lowest power consumption. Thus, the UE may select the first beam upon determining that the second power consumption is higher than the first power consumption.

In some implementations, the circuit/module for selecting a beam for wireless communication 1228 of FIG. 12 performs the operations of block 1406 and/or other similar operations as taught herein. In some implementations, the code for selecting a beam for wireless communication 1248 of FIG. 12 is executed to perform the operations of block 1406 and/or other similar operations as taught herein.

In some aspects, a process in accordance with the teachings herein may include any combination of the above operations.

Fourth Example Process

Figure 15:
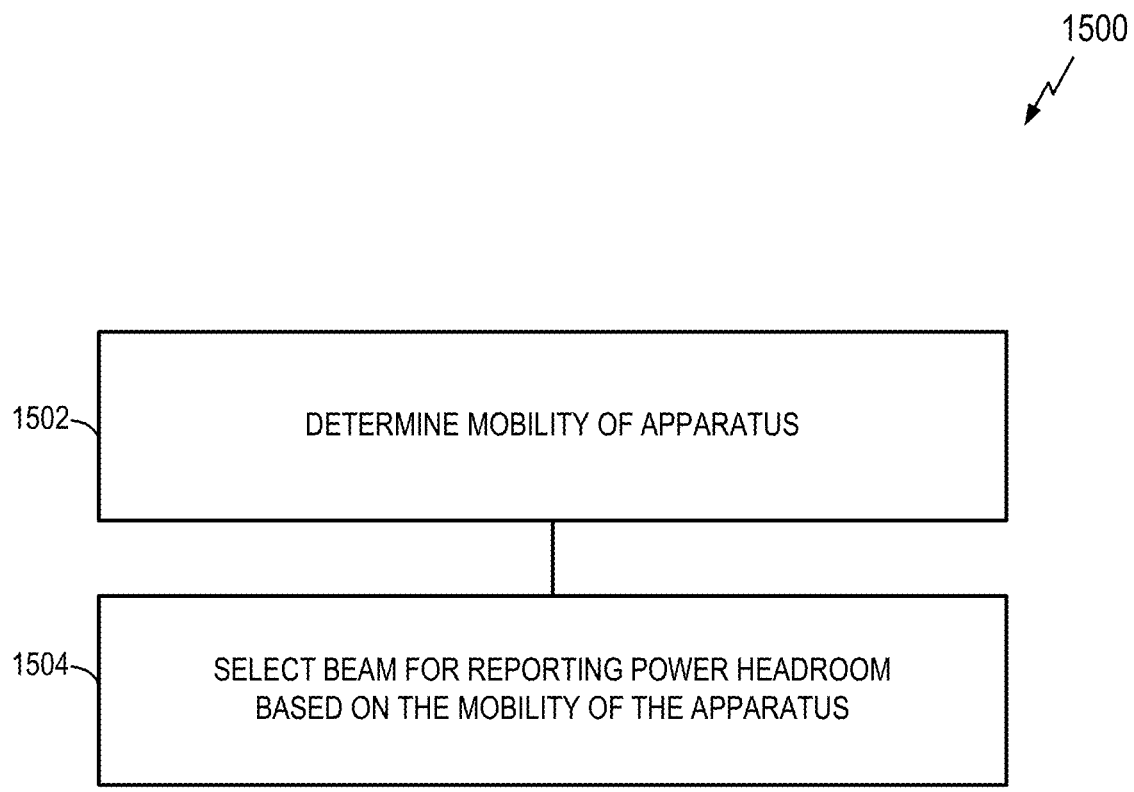
FIG. 15 is a flowchart illustrating an example of a process for selecting a beam for power headroom reporting based on mobility in accordance with some aspects of the disclosure.

FIG. 15 illustrates a process 1500 for communication in accordance with some aspects of the disclosure. In some aspects, the process 1500 may be performed in conjunction with (e.g., as part of or in addition to) the process 1100 of FIG. 11. For example, one or more of the operations of the process 1500 may correspond in one or more aspects to the operations of block 1106 of FIG. 11. The process 1500 may take place within a processing circuit (e.g., the processing circuit 1010 of FIG. 10 or the processing circuit 1210 of FIG. 12), which may be located in a UE, an access terminal, a gNB, a TRP, a base station, or some other suitable apparatus. Of course, in various aspects within the scope of the disclosure, the process 1500 may be implemented by any suitable apparatus capable of supporting communication-related operations.

At block 1502, an apparatus (e.g., a UE) determines the mobility of the apparatus. In some aspects, the mobility may include rotation and/or movement. For example, a UE may compare its rotation (e.g., revolutions per second, etc.) to a rotation threshold and/or compare its movement (e.g., velocity, distance moved over a period of time, etc.) to a movement threshold.

In some implementations, the circuit/module for determining 1230 of FIG. 12 performs the operations of block 1502 and/or other similar operations as taught herein. In some implementations, the code for determining 1250 of FIG. 12 is executed to perform the operations of block 1502 and/or other similar operations as taught herein.

At block 1504, the apparatus selects a beam (e.g., the first beam or the second beam) for reporting power headroom based on the mobility of the apparatus determined at block 1502. For example, a UE may elect to use a wider beam (e.g., an omni-directional beam) if the mobility of the UE is relatively high (e.g., greater than or equal to at least one mobility threshold). Conversely, a UE may elect to use a narrower beam if the mobility of the UE is low high (e.g., less than or equal to at least one mobility threshold).

In some implementations, the circuit/module for selecting a beam for reporting power headroom 1226 of FIG. 12 performs the operations of block 1504 and/or other similar operations as taught herein. In some implementations, the code for selecting a beam for reporting power headroom 1246 of FIG. 12 is executed to perform the operations of block 1504 and/or other similar operations as taught herein.

In some aspects, a process in accordance with the teachings herein may include any combination of the above operations.

Fifth Example Process

Figure 16:
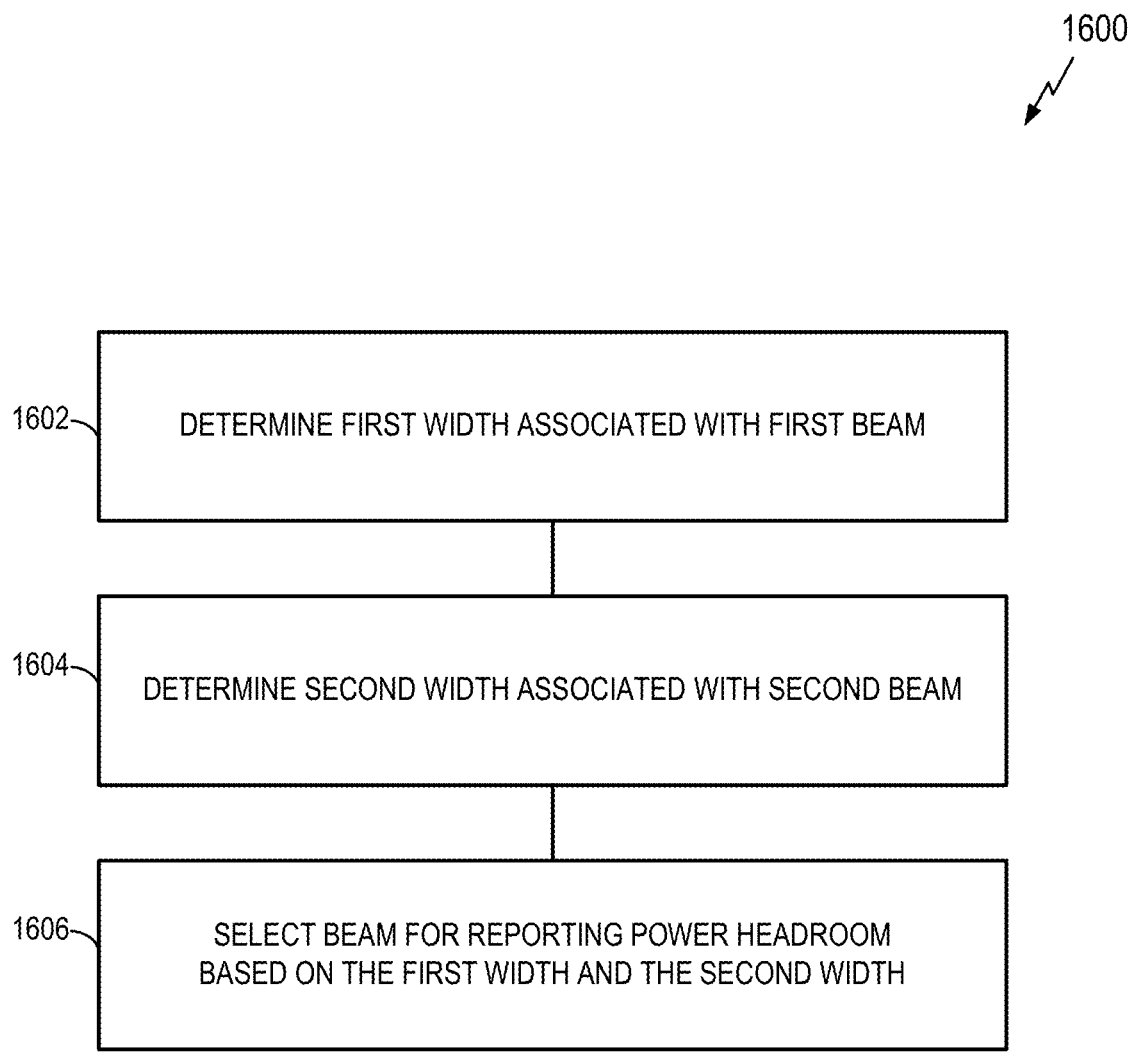
FIG. 16 is a flowchart illustrating an example of a process for selecting a beam for power headroom reporting based on beam width in accordance with some aspects of the disclosure.

FIG. 16 illustrates a process 1600 for communication in accordance with some aspects of the disclosure. In some aspects, the process 1600 may be performed in conjunction with (e.g., as part of or in addition to) the process 1100 of FIG. 11. For example, one or more of the operations of the process 1600 may correspond in one or more aspects to the operations of block 1106 of FIG. 11. The process 1600 may take place within a processing circuit (e.g., the processing circuit 1010 of FIG. 10 or the processing circuit 1210 of FIG. 12), which may be located in a UE, an access terminal, a gNB, a TRP, a base station, or some other suitable apparatus. Of course, in various aspects within the scope of the disclosure, the process 1600 may be implemented by any suitable apparatus capable of supporting communication-related operations.

At block 1602, an apparatus (e.g., a UE) determines a first width associated with a first beam. For example, a UE may determine the width of a sector beam or an omni-directional beam.

In some implementations, the circuit/module for determining 1230 of FIG. 12 performs the operations of block 1602 and/or other similar operations as taught herein. In some implementations, the code for determining 1250 of FIG. 12 is executed to perform the operations of block 1602 and/or other similar operations as taught herein.

At block 1604, the apparatus determines a second width associated with a second beam. For example, a UE may determine the width of a narrow beam.

In some implementations, the circuit/module for determining 1230 of FIG. 12 performs the operations of block 1604 and/or other similar operations as taught herein. In some implementations, the code for determining 1250 of FIG. 12 is executed to perform the operations of block 1604 and/or other similar operations as taught herein.

At block 1606, the apparatus selects a beam (e.g., the first beam or the second beam) for reporting the power headroom based on the first width and the second width. For example, the UE may select the beam having a narrower width (e.g., less than or equal to a threshold width) in a scenario where the mobility of the apparatus is relatively high. Conversely, the UE may select the beam having a wider width (e.g., greater than or equal to a threshold width) in a scenario where the mobility of the apparatus is relatively low.

In some implementations, the circuit/module for selecting a beam for reporting power headroom 1226 of FIG. 12 performs the operations of block 1606 and/or other similar operations as taught herein. In some implementations, the code for selecting a beam for reporting power headroom 1246 of FIG. 12 is executed to perform the operations of block 1606 and/or other similar operations as taught herein.

In some aspects, a process in accordance with the teachings herein may include any combination of the above operations.

Sixth Example Process

Figure 17:
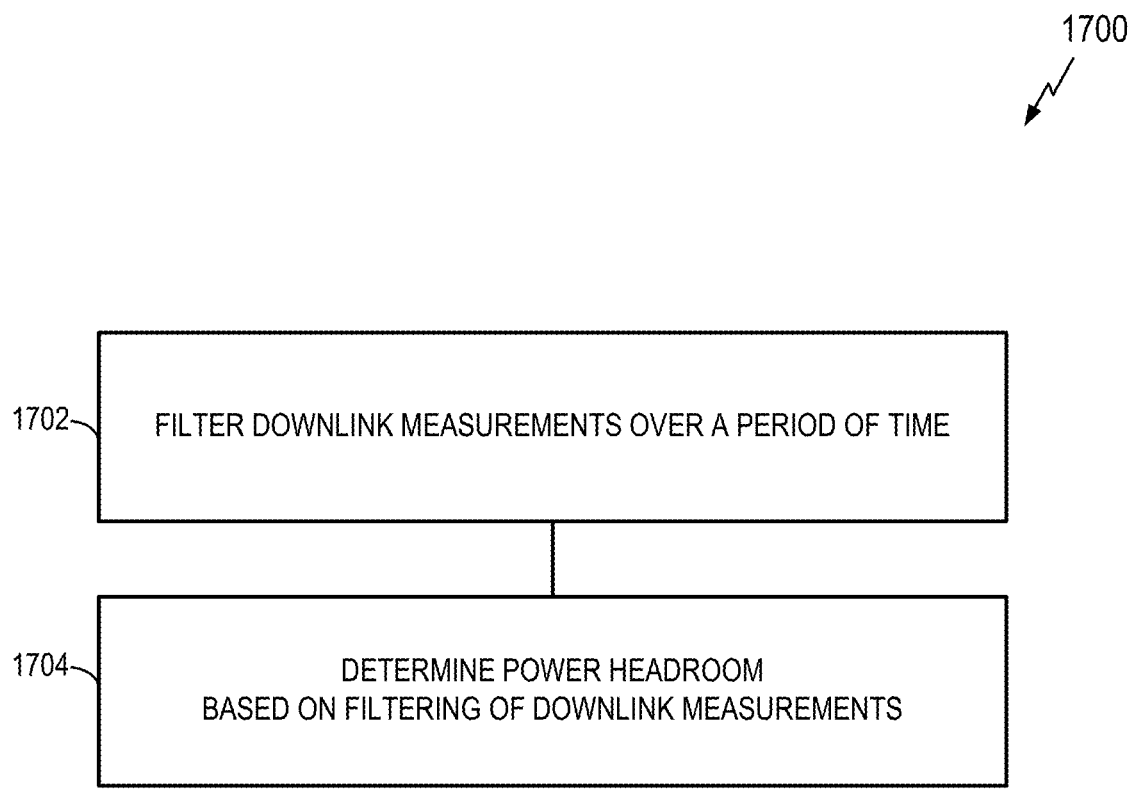
FIG. 17 is a flowchart illustrating an example of a process for determining a power headroom in accordance with some aspects of the disclosure.

FIG. 17 illustrates a process 1700 for communication in accordance with some aspects of the disclosure. In some aspects, the process 1700 may be performed in conjunction with (e.g., as part of or in addition to) the process 1100 of FIG. 11. For example, one or more of the operations of the process 1700 may correspond in one or more aspects to the operations of block 1106 of FIG. 11, block 1302 of FIG. 13, and block 1304 of FIG. 13. The process 1700 may take place within a processing circuit (e.g., the processing circuit 1010 of FIG. 10 or the processing circuit 1210 of FIG. 12), which may be located in a UE, an access terminal, a gNB, a TRP, a base station, or some other suitable apparatus. Of course, in various aspects within the scope of the disclosure, the process 1700 may be implemented by any suitable apparatus capable of supporting communication-related operations.

At block 1702, an apparatus (e.g., a UE) filters downlink measurements over a period of time. For example, the apparatus may determine an average (or some other function) of a set of RSCP measurements and/or a set of path loss measurements.

In some implementations, the circuit/module for determining 1230 of FIG. 12 performs the operations of block 1702 and/or other similar operations as taught herein. In some implementations, the code for determining 1250 of FIG. 12 is executed to perform the operations of block 1702 and/or other similar operations as taught herein.

At block 1704, the apparatus determines the power headroom (e.g., for the second beam) based on the filtering of downlink measurements performed at block 1702.

In some implementations, the circuit/module for determining 1230 of FIG. 12 performs the operations of block 1704 and/or other similar operations as taught herein. In some implementations, the code for determining 1250 of FIG. 12 is executed to perform the operations of block 1704 and/or other similar operations as taught herein.

In some aspects, a process in accordance with the teachings herein may include any combination of the above operations.

Seventh Example Process

Figure 18:
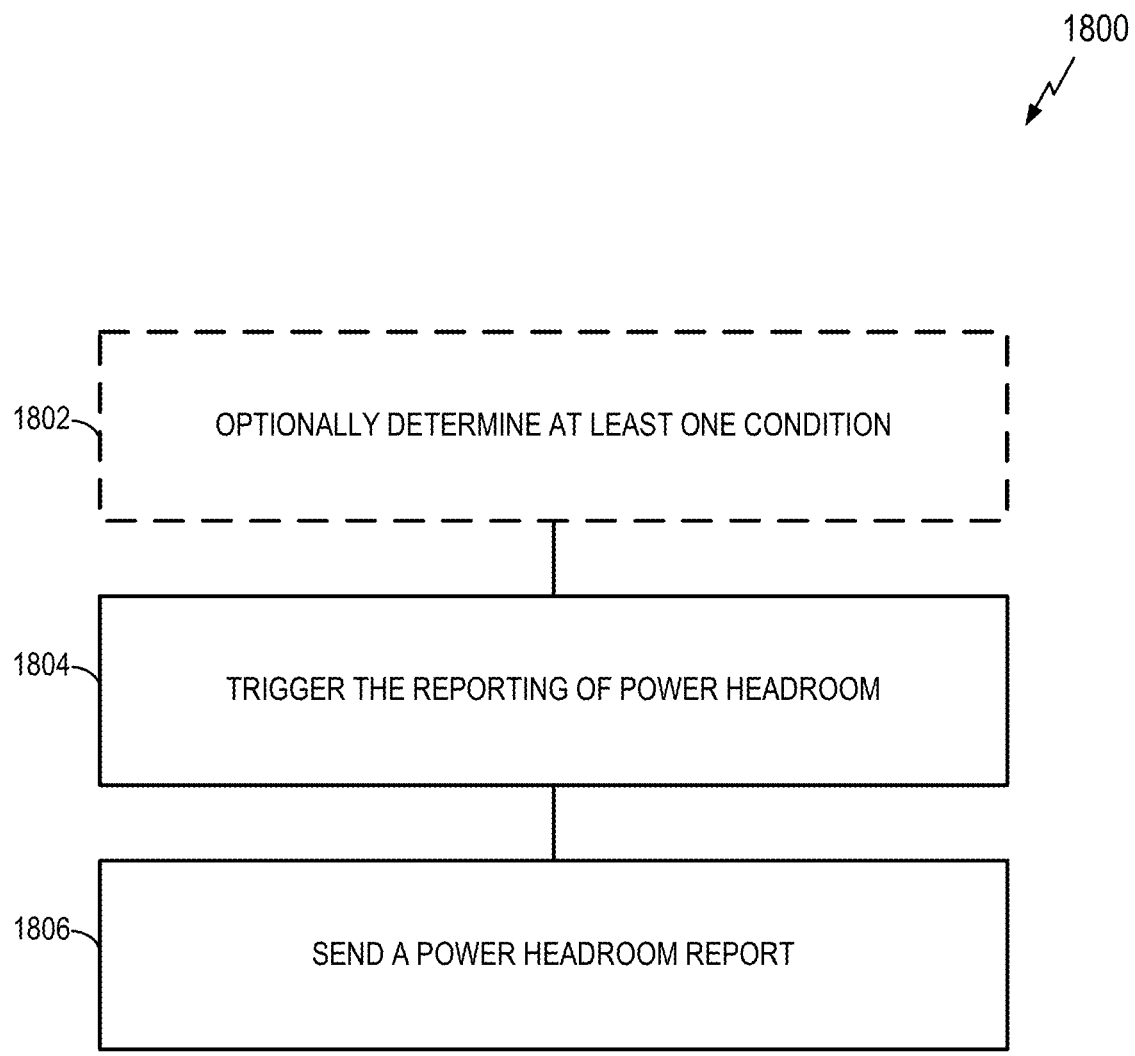
FIG. 18 is a flowchart illustrating an example of a process for triggering power headroom reporting in accordance with some aspects of the disclosure.

FIG. 18 illustrates a process 1800 for communication in accordance with some aspects of the disclosure. In some aspects, the process 1800 may be performed in conjunction with (e.g., as part of or in addition to) the process 1100 of FIG. 11. For example, one or more of the operations of the process 1800 may correspond in one or more aspects to the operations of block 1106 of FIG. 11. The process 1800 may take place within a processing circuit (e.g., the processing circuit 1010 of FIG. 10 or the processing circuit 1210 of FIG. 12), which may be located in a UE, an access terminal, a gNB, a TRP, a base station, or some other suitable apparatus. Of course, in various aspects within the scope of the disclosure, the process 1800 may be implemented by any suitable apparatus capable of supporting communication-related operations.

At optional block 1802, an apparatus (e.g., a UE) may determine at least one condition. For example, the apparatus may determine one or more of: that a different beam has been selected, that the path losses of two beams differ by at least a threshold amount, that mobility of the apparatus has changed, and so on.

In some implementations, the circuit/module for determining 1230 of FIG. 12 performs the operations of block 1802 and/or other similar operations as taught herein. In some implementations, the code for determining 1250 of FIG. 12 is executed to perform the operations of block 1802 and/or other similar operations as taught herein.

At block 1804, the apparatus triggers the reporting of power headroom (e.g., based on at least one condition determined at block 1802). In some aspects, triggering the reporting of the power headroom may be based on the selection of a second beam. In some aspects, triggering the reporting of the power headroom may be based on a first path loss associated with a first beam and a second path loss associated with a second beam. In some aspects, triggering the reporting of the power headroom may be based on a change in mobility of the apparatus.

In some implementations, the circuit/module for triggering 1232 of FIG. 12 performs the operations of block 1804 and/or other similar operations as taught herein. In some implementations, the code for triggering 1252 of FIG. 12 is executed to perform the operations of block 1804 and/or other similar operations as taught herein.

At block 1806, the apparatus sends a power headroom report as a result of the trigger of block 1804.

In some implementations, the circuit/module for reporting 1224 of FIG. 12 performs the operations of block 1806 and/or other similar operations as taught herein. In some implementations, the code for reporting 1244 of FIG. 12 is executed to perform the operations of block 1804 and/or other similar operations as taught herein.

In some aspects, a process in accordance with the teachings herein may include any combination of the above operations.

Eighth Example Process

Figure 19:
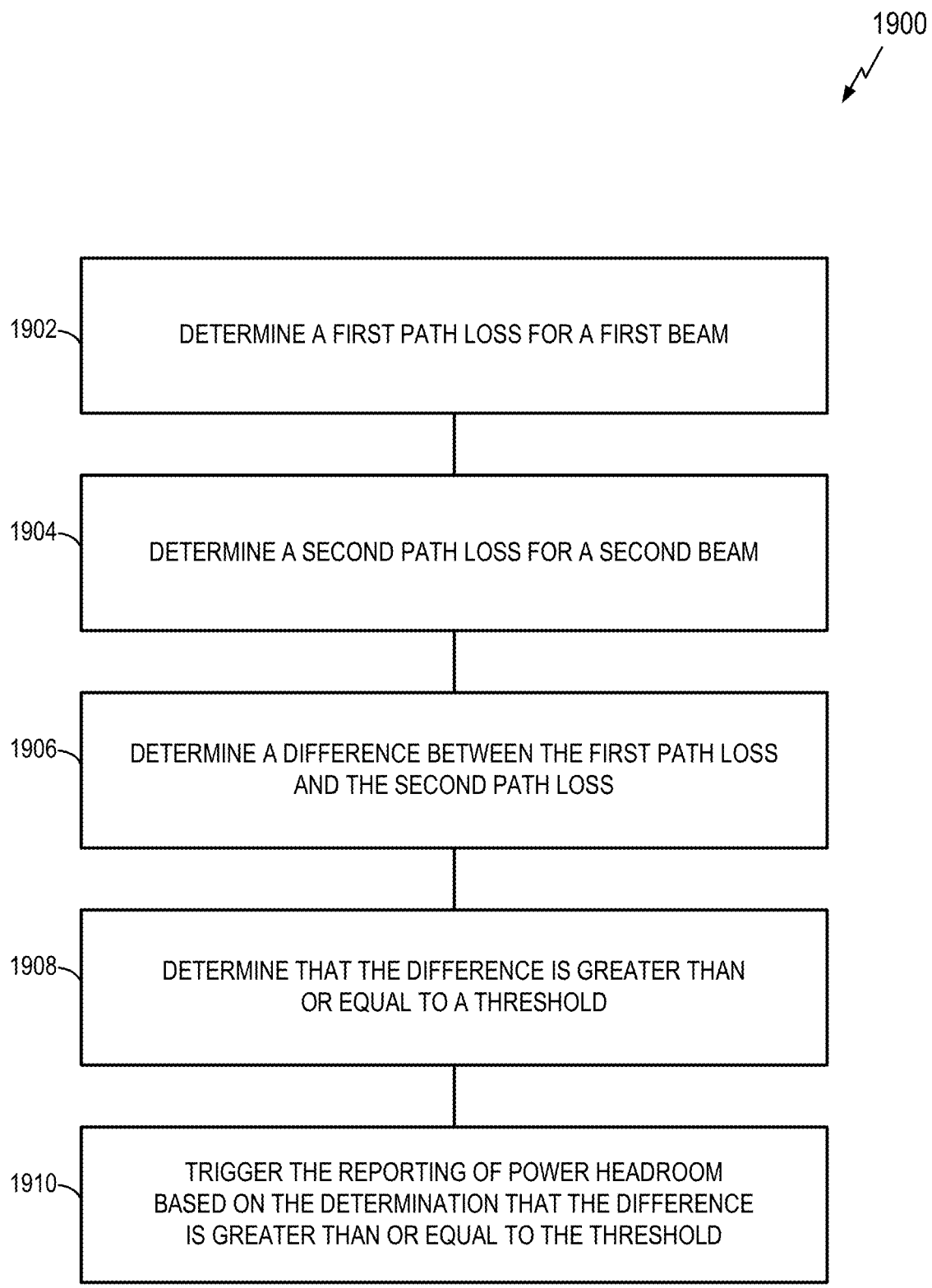
FIG. 19 is a flowchart illustrating another example of a process for triggering power headroom reporting in accordance with some aspects of the disclosure.

FIG. 19 illustrates a process 1900 for communication in accordance with some aspects of the disclosure. In some aspects, the process 1900 may be performed in conjunction with (e.g., as part of or in addition to) the process 1100 of FIG. 11. For example, one or more of the operations of the process 1900 may correspond in one or more aspects to the operations of block 1106 of FIG. 11. The process 1900 may take place within a processing circuit (e.g., the processing circuit 1010 of FIG. 10 or the processing circuit 1210 of FIG. 12), which may be located in a UE, an access terminal, a gNB, a TRP, a base station, or some other suitable apparatus. Of course, in various aspects within the scope of the disclosure, the process 1900 may be implemented by any suitable apparatus capable of supporting communication-related operations.

At block 1902, an apparatus (e.g., a UE) determines a first path loss for a first beam. In some implementations, the circuit/module for determining 1230 of FIG. 12 performs the operations of block 1902 and/or other similar operations as taught herein. In some implementations, the code for determining 1250 of FIG. 12 is executed to perform the operations of block 1902 and/or other similar operations as taught herein.

At block 1904, the apparatus determines a second path loss for a second beam. In some implementations, the circuit/module for determining 1230 of FIG. 12 performs the operations of block 1904 and/or other similar operations as taught herein. In some implementations, the code for determining 1250 of FIG. 12 is executed to perform the operations of block 1904 and/or other similar operations as taught herein.

At block 1906, the apparatus determines a difference between the first path loss and the second path loss. In some implementations, the circuit/module for determining 1230 of FIG. 12 performs the operations of block 1906 and/or other similar operations as taught herein. In some implementations, the code for determining 1250 of FIG. 12 is executed to perform the operations of block 1906 and/or other similar operations as taught herein.

At block 1908, the apparatus determines that the difference is greater than or equal to a threshold. In some implementations, the circuit/module for determining 1230 of FIG. 12 performs the operations of block 1908 and/or other similar operations as taught herein. In some implementations, the code for determining 1250 of FIG. 12 is executed to perform the operations of block 1908 and/or other similar operations as taught herein.

At block 1910, the apparatus triggers the reporting of power headroom based on the determination that the difference is greater than or equal to a threshold at block 1908. In some implementations, the circuit/module for triggering 1232 of FIG. 12 performs the operations of block 1910 and/or other similar operations as taught herein. In some implementations, the code for triggering 1252 of FIG. 12 is executed to perform the operations of block 1910 and/or other similar operations as taught herein.

In some aspects, a process in accordance with the teachings herein may include any combination of the above operations.

Other Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of wireless communication at a user equipment, comprising:

identifying a plurality of candidate beams for a wireless communication scheduled by a base station on an uplink resource, the plurality of candidate beams for the wireless communication comprising a first beam having a first beam width;

selecting the first beam of the plurality of candidate beams for transmission of the wireless communication, identifying a second beam of the plurality of candidate beams that is not used for the transmission of the wireless communication, has a second beam width that is narrower than the first beam width, and is associated with a first power headroom that is higher than a second power headroom associated with the first beam;

selecting the first power headroom for a power headroom report for the wireless communication as a result of the identifying the second beam; and transmitting the power headroom report for the wireless communication to the base station, wherein the power headroom report indicates the first power headroom.

2. The method of claim 1, wherein:

the selection of the first beam is based on at least one first criterion; and the method further comprises selecting the second beam as a basis for the power headroom report for the wireless communication based on at least one second criterion that is different from the at least one first criterion.

3. The method of claim 2, wherein the at least one first criterion comprises power consumption of the user equipment.

4. The method of claim 3, wherein the at least one second criterion comprises at least one of: beam width, reference signal received power (RSRP), path loss, or any combination thereof.

5. The method of claim 1, wherein the plurality of candidate beams is identified for communication associated with a particular spatial reference of the base station.

6. The method of claim 1, further comprising:
generating the power headroom report based on at least one of: the first beam or another beam of the plurality of candidate beams.

7. The method of claim 1, further comprising:
selecting the second beam as a basis for the power headroom report for the wireless communication based on mobility of the user equipment.

8. The method of claim 7, wherein the mobility comprises rotation or movement.

9. The method of claim 1, further comprising:
selecting the first beam based on mobility of the user equipment.

10. The method of claim 1, further comprising:
triggering the transmission of the power headroom report based on a first path loss associated with the first beam and a second path loss associated with the second beam.

11. The method of claim 1, further comprising:
determining a first path loss for the first beam;
determining a second path loss for the second beam;
determining a difference between the first path loss and the second path loss;
determining that the difference is greater than or equal to a threshold; and
triggering the transmission of the power headroom report based on the determination that the difference is greater than or equal to the threshold.

12. The method of claim 1, further comprising:
triggering the transmission of the power headroom report based on a change in mobility of the user equipment.

13. A user equipment, comprising:
a memory; and
a processing circuit coupled to the memory and configured to:
identify a plurality of candidate beams for a wireless communication scheduled by a base station on an uplink resource, the plurality of candidate beams for the wireless communication comprising a first beam having a first beam width,
select the first beam of the plurality of candidate beams for transmission of the wireless communication,
identify a second beam of the plurality of candidate beams that is not used for the transmission of the wireless communication, has a second beam width that is narrower than the first beam width, and is associated with a first power headroom that is higher than a second power headroom associated with the first beam,
select the first power headroom for a power headroom report for the wireless communication as a result of the identification of the second beam, and
transmit the power headroom report for the wireless communication to the base station, wherein the power headroom report indicates the first power headroom.

14. The user equipment of claim 13, wherein the processing circuit is further configured to:
select the second beam based on the first power headroom and the second power headroom.

15. The user equipment of claim 14, wherein the selection of the second beam comprises:
determining that the second power headroom is lower than the first power headroom.

16. The user equipment of claim 14, wherein the selection of the second beam is further based on mobility of the user equipment.

17. The user equipment of claim 16, wherein the mobility comprises rotation, movement, or rotation and movement.

18. The user equipment of claim 14, wherein the processing circuit is further configured to:
trigger the transmission of the power headroom report based on the selection of the second beam.

19. The user equipment of claim 13, wherein the processing circuit is further configured to:
select the first beam based on a first power consumption associated with the first beam and a second power consumption associated with the second beam.

20. The user equipment of claim 19, wherein the first power consumption is lower than the second power consumption.

21. The user equipment of claim 13, wherein the processing circuit is further configured to:
select the first beam based on a first per-antenna element power consumption associated with the first beam and a second per-antenna element power consumption associated with the second beam.

22. The user equipment of claim 13, wherein the processing circuit is further configured to:
select the first beam based on mobility of the user equipment.

23. A user equipment, comprising:
means for identifying a plurality of candidate beams for a wireless communication scheduled by a base station on an uplink resource, the plurality of candidate beams for the wireless communication comprising a first beam having a first beam width;
means for selecting the first beam of the plurality of candidate beams for transmission of the wireless communication,
means for identifying a second beam of the plurality of candidate beams that is not used for the transmission of the wireless communication, has a second beam width that is narrower than the first beam width, and is associated with a first power headroom that is higher than a second power headroom associated with the first beam;
means for selecting the first power headroom for a power headroom report for the wireless communication as a result of the identifying the second beam; and
means for transmitting the power headroom report for the wireless communication to the base station, wherein the power headroom report indicates the first power headroom.

24. The user equipment of claim 23, wherein:
the selection of the first beam is based on at least one first criterion; and
the user equipment further comprises means for selecting the second beam as a basis for the power headroom report for the wireless communication based on at least one second criterion that is different from the at least one first criterion.

25. The user equipment of claim 23, further comprising: means for triggering the transmission of the power headroom report, wherein the triggering is based on a selection of the second beam, based on the first width of the first beam and the second width of the second beam, based on a first path loss associated with the first beam and a second path loss associated with the second beam, or based on a change in mobility of the user equipment.

26. A non-transitory computer-readable medium storing computer-executable code for communication, including code that, when executed by one or more processors of a wireless communication device, cause the wireless communication device to:
identify a plurality of candidate beams for a wireless communication scheduled by a base station on an uplink resource, the plurality of candidate beams for the wireless communication comprising a first beam having a first beam width;
select the first beam of the plurality of candidate beams for transmission of the wireless communication,
identify a second beam of the plurality of candidate beams that is not used for the transmission of the wireless communication, has a second beam width that is narrower than the first beam width, and is associated with a first power headroom that is higher than a second power headroom associated with the first beam;
select the first power headroom for a power headroom report for the wireless communication as a result of the identification of the second beam; and
transmit the power headroom report for the wireless communication to the base station, wherein the power headroom report indicates the first power headroom.

\* \* \* \* \*